(12) United States Patent
Sherman et al.

(10) Patent No.: US 8,045,922 B2
(45) Date of Patent: Oct. 25, 2011

(54) APPARATUS FOR AND METHOD OF BLUETOOTH AND WIRELESS LOCAL AREA NETWORK COEXISTENCE USING A SINGLE ANTENNA IN A COLLOCATED DEVICE

(75) Inventors: Itay Sherman, Ra'anana (IL); Avishai P. Shoham, Ramat Gan (IL); Yaniv Tzoreff, Tel Aviv (IL)

(73) Assignee: Texas Instruments Incorporated, Dallas, TX (US)

( * ) Notice: Subject to any disclaimer, the term of this patent is extended or adjusted under 35 U.S.C. 154(b) by 784 days.

(21) Appl. No.: 11/944,505

(22) Filed: Nov. 23, 2007

(65) Prior Publication Data

US 2009/0137206 A1 May 28, 2009

(51) Int. Cl.
*H04B 7/00* (2006.01)

(52) U.S. Cl. .......... 455/41.2; 455/552.1; 455/553.1; 455/419; 455/74.1; 370/328; 370/338

(58) Field of Classification Search .......... 455/41.2, 455/552.1, 553.1, 419, 74.1, 272, 101, 129, 455/277.1, 283, 288; 370/328, 338
See application file for complete search history.

(56) References Cited

U.S. PATENT DOCUMENTS

| | | | |
|---|---|---|---|
| 2005/0059347 A1* | 3/2005 | Haartsen | 455/41.2 |
| 2006/0239223 A1 | 10/2006 | Sherman et al. | |
| 2006/0274704 A1* | 12/2006 | Desai et al. | 370/338 |
| 2006/0292986 A1 | 12/2006 | Bitran et al. | |
| 2006/0292987 A1 | 12/2006 | Ophir et al. | |
| 2007/0223508 A1* | 9/2007 | Nandagopalan | 370/431 |

OTHER PUBLICATIONS

U.S. Appl. No. 11/669,315, filed Jan. 31, 2007, Sherman et al.
U.S. Appl. No. 11/695,059, filed Apr. 2, 2007, Sherman.

* cited by examiner

*Primary Examiner* — Tuan Pham
(74) *Attorney, Agent, or Firm* — Ronald O. Neerings; Wade James Brady, III; Frederick J. Telecky, Jr.

(57) ABSTRACT

A novel and useful apparatus for and method of providing a mechanism for achieving coexistence between a Bluetooth system and WLAN system collocated in the same communications device such as a mobile terminal. The coexistence mechanism of the present invention functions to monitor WLAN and Bluetooth system activity, determine the access priority of both WLAN and Bluetooth systems, predict Bluetooth high priority packet transmission patterns, allocate bandwidth to both the Bluetooth and WLAN systems in accordance with the traffic patterns predicted, and switch the antenna and control the Bluetooth and WLAN power amplifiers when required.

8 Claims, 13 Drawing Sheets

APPARATUS FOR AND METHOD OF BLUETOOTH AND WIRELESS LOCAL AREA NETWORK COEXISTENCE USING A SINGLE ANTENNA IN A COLLOCATED DEVICE

CROSS REFERENCE TO RELATED APPLICATIONS

This application is related to U.S. application Ser. No. 11/167,619, filed Jun. 27, 2005, entitled "Method of Wireless Local Area Network and Bluetooth Network Coexistence in a Collocated Device," U.S. application Ser. No. 11/167,374, filed Jun. 27, 2005, entitled "Coexistent Bluetooth and Wireless Local Area Networks in a Multimode Terminal," and U.S. application Ser. No. 11/111,379, filed Apr. 21, 2005, entitled "Method and System for Bluetooth and Wireless Local Area Network Coexistence," all of which are incorporated herein by reference in their entirety.

FIELD OF THE INVENTION

The present invention relates to the field of data communications and more particularly relates to an apparatus for and method of Bluetooth and Wireless Local Area Network (WLAN) coexistence in a collocated device.

BACKGROUND OF THE INVENTION

Currently, there is huge demand for converged mobile devices which combine data and telephony capabilities. Technological advances such as extremely low power consumption, improvements in form factor, pricing and co-existence technology for 802.11 (WLAN) and Bluetooth are fueling the demand.

Wireless communication devices such as WLAN and Bluetooth devices are generally constrained to operate in a certain frequency band of the electromagnetic spectrum. The use of frequency bands is licensed by government regulatory agencies, for example, the U.S. Federal Communications Commission (FCC) and the European Radio Communications Office. Licensing is necessary in order to prevent interference between multiple broadcasters trying to use the same frequency band in an area.

Regulatory agencies also specify frequency bands for devices that emit radio frequencies, where licensing is not required. Wireless communication devices using these unlicensed frequency bands generally transmit at low power over a small area. The Industrial, Scientific, or Medical equipment (ISM) band is one such frequency band located between 2.4 and 2.5 GHz. This 2.4 GHz band is used by many wireless communication devices for data and/or voice communication networks.

An example of such a network is defined by the Bluetooth specification. Bluetooth specifies communication protocols for low cost, low power wireless devices that operate over a very small area, the so-called, personal area network. These wireless devices may include, for example, telephone headsets, cell phones, Internet access devices, personal digital assistants, laptop computers, etc. The Bluetooth specification effectively replaces cables used to connect communicating devices, for example, a cell phone and a headset, with a wireless radio link to provide greater ease of use by reducing the tangle of wires frequently associated with personal communication systems. Several such personal communication devices may be wirelessly linked together by using the Bluetooth specification, which derives its name from Harald Blatand (Blatand is Danish for Bluetooth), a 10th century Viking king who united Denmark and Norway.

Bluetooth is an industrial specification for wireless personal area networks (PANs). Bluetooth provides a way to connect and exchange information between devices such as mobile phones, printers, PCs, laptops, and other digital equipment, over a secure, globally unlicensed short-range radio frequency (RF).

Bluetooth is a radio standard and communications protocol primarily designed for low power consumption, with a short range based on low-cost transceiver integrated circuits (ICs) in each device. Bluetooth networks enable these devices to communicate with each other when they are in range.

Bluetooth capability is increasingly built-in to many new products such as phones, printers, modems and headsets. Bluetooth is appropriate for situations when two or more devices are in proximity to each other and do not require high bandwidth. Bluetooth is most commonly used with phones and hand-held computing devices, either using a Bluetooth headset or transferring files from phones/PDAs to computers.

Bluetooth also simplified the discovery and setup of services, in contrast to WLAN which is more analogous to a traditional Ethernet network and requires configuration to set up shared resources, transmit files, set up audio links (e.g., headsets and hands-free devices), whereas Bluetooth devices advertise all the services they provide; thus making the service more accessible, without the need to worry about network addresses, permissions, etc.

Because Bluetooth devices operate in the unlicensed 2.4 GHz RF band, they are subject to radio interference from other wireless devices operating in the same frequency band. To avoid RF interference, the Bluetooth specification divides the 2.4 to 2.5 GHz frequency band into 1 MHz-spaced channels. Each channel signals data packets at 1 Mb/s, using a Gaussian Frequency Shift Keying modulation scheme. A Bluetooth device transmits a modulated data packet to another Bluetooth device for reception. After a data packet is transmitted and received, both devices retune their radio to a different 1 MHz channel, effectively hopping from radio channel to radio channel, i.e., frequency-hopping spread spectrum (FHSS) modulation, within the 2.4 to 2.5 GHz frequency band. In this way, Bluetooth devices use most of the available 2.4 to 2.5 GHz frequency band and if a particular signal packet transmission/reception is compromised by interference on one channel, a subsequent retransmission of the particular signal packet on a different channel is likely to be effective.

Bluetooth devices operate in one of two modes: as a Master device or a Slave device. The Master device provides a network clock and determines the frequency hopping sequence. One or more Slave devices synchronize to the Master's clock and follow the Master's hopping frequency.

Bluetooth is a time division multiplexed system, where the basic unit of operation is a time slot of 625 microsecond duration. The Master device first transmits to the Slave device during a first time slot of 625 microseconds with both devices tuned to the same RF channel. Thus, the Master device transmits and the Slave device receives during the first time slot. Following the first time slot, the two devices retune their radios, or hop, to the next channel in the frequency hopping sequence for the second time slot. During the second time slot, the Slave device must respond whether it successfully understood, or not, the last packet transmitted by the Master during the first time slot. The Slave device thus transmits and the Master device receives during the second time slot. As a Slave device must respond to a Master's transmission, communication between the two devices requires at a minimum two time slots or 1.25 milliseconds.

Data packets, when transmitted over networks, are frequently susceptible to delays by, for example, retransmissions of packets caused by errors, sequence disorders caused by alternative transmission pathways, etc. Packet delays do not cause much of a problem with the transmission of digital data because the digital data may be retransmitted or resequenced by the receiver without effecting the operation of computer programs using the digital data. Packet delays or dropped packets during the transmission of voice signals, however, can cause unacceptable quality of service.

The Bluetooth specification version 1.1 provides a Synchronous Connection Oriented (SCO) link for voice packets that is a symmetric link between Master and Slave devices with periodic exchange of voice packets during reserved time slots. The Master device transmits SCO packets to the Slave device at regular intervals, defined as the SCO interval or $T_{SCO}$, which is counted in time slots. Bandwidth limitations limit the Bluetooth specification to a maximum of three SCO links. Therefore, the widest possible spacing for an SCO pair of time slots, which are sometimes called a voice slot, is every third voice slot. Bluetooth specification version 1.2 provides enhanced SCO links, i.e. eSCO links, which have a larger voice slot size, based on N*625 microsecond time slots, with larger and configurable intervals between voice slots. These eSCO links can be used for both voice or data applications.

The Institute of Electronic and Electrical Engineer (IEEE) 802.11 specification for Wireless Local Area Networks (WLANs) is also a widely used specification that defines a method of RF modulation, i.e. direct sequence spread spectrum (DSSS) and/or high-rate direct sequence spread spectrum (HR/DSSS), which also uses the same 2.4 GHz RF band as Bluetooth devices. Radio interference occurs when Bluetooth and WLAN devices try to communicate simultaneously over the same RF band.

Direct-sequence modulation is a spread spectrum technique used to transmit a data packet over a wide frequency band. The RF energy is spread over a wide band in a mathematically controlled way. Changes in the radio carrier are present across a wide band and receivers perform correlation processes to look for changes. Correlation provides DSSS and HR/DSSS transmissions excellent protection against radio interference because noise tends to take the form of relatively narrow pulses that do not produce coherent effects across the entire frequency band. Hence, the correlation function spreads out the noise across the band, while the correlated signal shows a much greater signal amplitude. Direct-sequence modulation trades bandwidth for throughput.

WLANs can operate as independent networks, in which stations, e.g., laptop computers, communicate directly with each other, or as infrastructure networks that comprise stations, which are radio linked to a wired backbone network, e.g., Ethernet, by an access point. An access point that is associated with one or more stations forms an infrastructure service set, which provides network services to an infrastructure basic service area. All communication between stations in an infrastructure service set must go through an access point. Each station, at any point in time, is only associated with one access point. If a station, i.e. the source, in an infrastructure service set needs to communicate with another station, i.e. the destination, the source station first transmits by radio a data packet to its access point. The access point receives the radio transmission and then transmits the data packet to the destination station.

Several access points can be linked to a wired backbone network to form an extended service set comprising multiple infrastructure service sets and forming a corresponding extended service area. Access points are typically located along the wired backbone network forming overlapping infrastructure service areas, allowing for movement of a station from one infrastructure service area to another infrastructure service area without loss of communication between other stations of the extended service set.

Access points, which derive their power from the wired backbone network, assist stations, which are typically battery-powered, to save power. Access points remember when a station enters a power-saving mode, i.e. a sleep state, and buffer packets directed to the sleeping station. Battery-powered stations can therefore turn their wireless transceiver off and power up only to transmit and retrieve buffered data packets from the access point. The mobile station power saving mode is one of the most important features offered by an infrastructure network.

WLANs manage the communication of information from stations to a network in order for stations in search of connectivity to locate a compatible wireless network, to authenticate a mobile station for connection to a particular wireless network and to associate a mobile station with a particular access point to gain access to the wired backbone network. These management communications are defined under the WLAN specification by the Media Access Control (MAC). The MAC includes a large number of management frames that communicate network management functions, e.g., a Request for Association from a station to an access point, in an infrastructure network.

A station locates an existing WLAN network by either passive scanning or active scanning. Passive scanning saves battery power because it does not require transmitting. The station awakens from a sleep mode and listens or scans for a Beacon management frame, which broadcasts the parameters and capabilities of an infrastructure network from an access point. From the traffic indication map of the Beacon frame, the station determines if an access point has buffered traffic on its behalf. To retrieve buffered frames, the station uses a Power Save (PS)-Poll control frame. Active scanning requires that the station actively transmit a Probe Request frame to solicit a response from an infrastructure network with a given name and of known parameters and capabilities. After determining that a responding network of a given name and of known parameters and capabilities is present, the station sequentially joins, authenticates and requests an association with the responding network by transmitting an Association Request management frame. After receipt of the Association Request frame, an access point responds to the station with an Association Response management frame and the station now has access to the wired backbone network and its associated extended service area.

Management frames, such as an Association Request from a station, or an Association Response, a Beacon and a Probe Response from an access point, include a MAC header, a frame body containing information elements and fixed fields and a frame check sequence. Information elements are variable-length components of management frames that contain information about the parameters and capabilities of the network's operations. A generic information element has an ID number, a length, and a variable-length component. Element ID numbers are defined by IEEE standards for some of the 256 available values, other values are reserved. The value 221 is used for vendor specific extensions and is used extensively in the industry.

As Bluetooth personal area networks and WLANs use the same ISM RF band of 2.4 GHz to 2.5 GHz, radio interference between the different devices can degrade network communications, e.g., decreased data throughput and quality of voice service caused by retransmissions resulting from interference.

Therefore, there is a need for a coexistence mechanism between Bluetooth and WLAN devices operating in the same device. The coexistence mechanism should provide for controlled and limited performance degradations in either the Bluetooth or WLAN radios and should have a minimal impact on cost and required resources in its implementation. In particular, the mechanism should not miss any Bluetooth high priority (HP) packets. The coexistence problem between Bluetooth and WLAN is further complicated by the fact that WLAN processes are not synchronous, the AP rate mechanism cannot be controlled and the mechanism should not miss any Bluetooth high priority (HP) packets.

SUMMARY OF THE INVENTION

The present invention is a novel and useful apparatus for and method of providing a mechanism for achieving coexistence between a Bluetooth system and WLAN system collocated in the same communications device such as a mobile terminal. The coexistence mechanism of the present invention functions to (1) monitor WLAN and Bluetooth system activity, (2) determine the access priority of both WLAN and Bluetooth systems, (3) predict Bluetooth high priority packet transmission patterns, (4) allocate bandwidth to both the Bluetooth and WLAN systems in accordance with the traffic patterns predicted, and (5) switch the antenna and control the Bluetooth and WLAN power amplifiers when required.

The coexistence mechanism ensures the voice quality of both Bluetooth and WLAN links. "Clean voice" performance is achieved by scheduling WLAN system transactions such that they do not impair Bluetooth transmissions. The invention comprises a packet transmission arbitration (PTA) machine that schedules the transmissions of the AP and the STA. The AP transmissions are scheduled by utilizing Power Save (PS) mode (or APSD in QoS) and CTS-TO-SELF packets. The PS mode is initiated whenever the coexistence algorithm of the invention is enabled (i.e. invoked or active).

When a Bluetooth high priority (HP) transaction (transmission, packet or frame) is detected, a Bluetooth Prediction Machine (PRM) with the PTA identifies Bluetooth high priority transmission patterns. The STA and AP transmissions are scheduled in the available time period between Bluetooth high priority frames. If there no periodic Bluetooth high priority traffic is detected, the WLAN system operates in PS mode, but without the need to schedule WLAN transmissions in such a way that will not harm Bluetooth transmissions.

Although the mechanism of the present invention can be used in numerous types of communication systems, to aid in illustrating the principles of the present invention, the description of the coexistence mechanism is provided in the context of a Bluetooth/WLAN radio enabled communication device such as a cellular phone.

Although the coexistence mechanism of the present invention can be incorporated in numerous types of Bluetooth/WLAN enabled communication devices such a multimedia player, cellular phone, PDA, etc., it is described in the context of a cellular phone. It is appreciated, however, that the invention is not limited to the example applications presented, whereas one skilled in the art can apply the principles of the invention to other communication systems as well without departing from the scope of the invention.

Note that some aspects of the invention described herein may be constructed as software objects that are executed in embedded devices as firmware, software objects that are executed as part of a software application on either an embedded or non-embedded computer system such as a digital signal processor (DSP), microcomputer, minicomputer, microprocessor, etc. running a real-time operating system such as WinCE, Symbian, OSE, Embedded LINUX, etc. or non-real time operating system such as Windows, UNIX, LINUX, etc., or as soft core realized HDL circuits embodied in an Application. Specific Integrated Circuit (ASIC) or Field Programmable Gate Array (FPGA), or as functionally equivalent discrete hardware components.

There is thus provided in accordance with the invention, a method of detecting a Bluetooth high priority period, the method comprising the steps of providing a first array containing differences between short duration Bluetooth high priority transactions, providing a second array containing differences between long duration Bluetooth high priority transactions, determining the difference in frames between a current transaction and a previous transaction, adding the difference to either the first or second arrays in accordance therewith, comparing the difference to differences previously stored in the first and second arrays and declaring an active period if the number of matches exceed a threshold and setting the duration of the current transaction in accordance with the duration measured in the previous transaction.

There is also provided in accordance with the invention, a method of coexistence in a communications device incorporating a wireless local area network (WLAN) system and a Bluetooth system that share a single antenna, the method comprising the steps of monitoring activity of the WLAN system and the Bluetooth system within the device, determining access priority of the WLAN system and the Bluetooth system, predicting high priority (HP) patterns of the Bluetooth system, allocating bandwidth of the device in accordance with the predictions and switching the single antenna between the WLAN system and the Bluetooth system in accordance with the bandwidth allocation.

There is further provided in accordance with the invention, a method of predicting Bluetooth high priority transmissions in a communications device incorporating a wireless local area network (WLAN) system and a Bluetooth system that share a single antenna, the method comprising the steps of tracing periodic Bluetooth high priority transmissions by detecting differences between Bluetooth high priority transmission durations and entering a Bluetooth high priority protection mode if the results of the tracing meet a predetermined period criteria.

There is also provided in accordance with the invention, a coexistence communications device comprising a wireless local area network (WLAN) system, a Bluetooth system adapted to share a single antenna with the WLAN system and a packet traffic arbitration machine operative to receive requests from the Bluetooth system and the WLAN system and to allocate bandwidth therebetween.

There is further provided in accordance with the invention, a coexistence communications device comprising a wireless local area network (WLAN) system, a Bluetooth system adapted to share a single antenna with the WLAN system, a Bluetooth prediction machine for detecting Bluetooth high priority transmission periods and a decision generator for receiving requests from the Bluetooth system and the WLAN system and to allocate bandwidth therebetween in accordance with the output of the Bluetooth prediction machine.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

Figure 1:
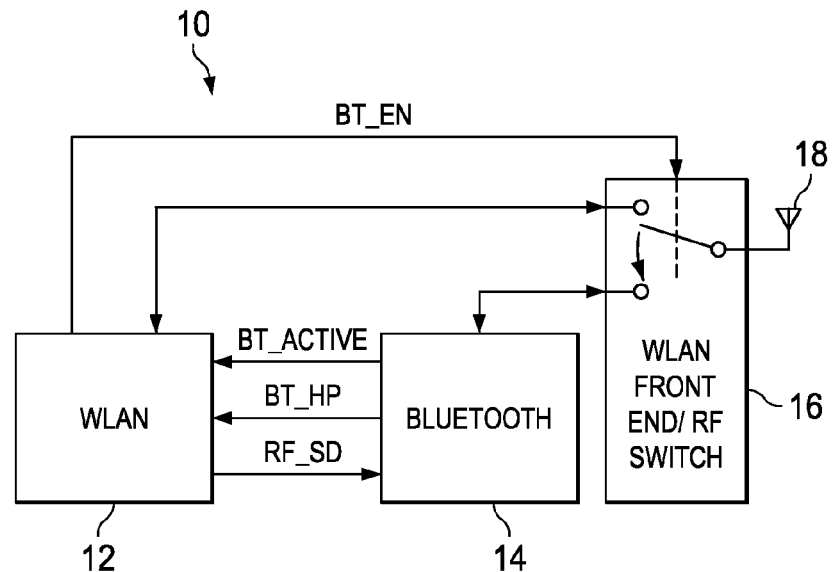
FIG. 1 is a block diagram illustrating an example embodiment of the Bluetooth and WLAN coexistence platform sharing a single antenna.

The following notation is used throughout this document.

| Term | Definition |
|---|---|
| AC | Alternating Current |
| AHF | Adaptive High Frequency |
| AP | Access Point |
| APSD | Automatic Power Save Delivery |
| ASIC | Application Specific Integrated Circuit |
| ATIM | Announcement Traffic Indication Message |
| AVI | Audio Video Interleave |

-continued

| Term | Definition |
|---|---|
| BMP | Windows Bitmap |
| BSS | Basic Service Set |
| BT | Bluetooth |
| CCA | Clear Channel Assessment |
| CPU | Central Processing Unit |
| CW | Contention Window |
| DC | Direct Current |
| DSP | Digital Signal Processor |
| DSSS | Direct Sequence Spread Spectrum |
| DTIM | Delivery Traffic Indication Message |
| EDR | Enhanced Data Rate |
| EEPROM | Electrically Erasable Programmable Read Only Memory |
| ELP | Encoded Level Point |
| EPROM | Erasable Programmable Read Only Memory |
| ESS | Extended Service Set |
| FCC | Federal Communications Commission |
| FCS | Frame Check Sequence |
| FE | Front End |
| FHSS | Frequency Hopping Spread Spectrum |
| FM | Frequency Modulation |
| FPGA | Field Programmable Gate Array |
| GPS | Ground Positioning Satellite |
| HDL | Hardware Description Language |
| HP | High Priority |
| HR | High Rate |
| I/F | Interface |
| IBSS | Independent Basic Service Set |
| IC | Integrated Circuit |
| ID | Identification |
| IE | Information Element |
| IEEE | Institute of Electrical and Electronics Engineers |
| IP | Internet Protocol |
| ISM | Industrial, Scientific, Medical |
| JPG | Joint Photographic Experts Group |
| LAN | Local Area Network |
| MAC | Media Access Control |
| MAC | Media Access Control |
| MBOA | Multiband OFDM Alliance |
| MP3 | MPEG-1 Audio Layer 3 |
| MPDU | MAC Protocol Data Unit |
| MPG | Moving Picture Experts Group |
| MSDU | MAC Service Data Unit |
| MSDU | MAC Service Data Unit |
| NIC | Network Interface Card |
| OFDM | Orthogonal Frequency Division Multiplexing |
| PAN | Personal Area Network |
| PC | Personal Computer |
| PCI | Personal Computer Interconnect |
| PDA | Portable Digital Assistant |
| PER | Packet Error Rate |
| PLCP | Physical Layer Conversion Protocol |
| PRM | Prediction Machine |
| PS | Power Save |
| PTA | Packet Traffic Arbitration |
| RAM | Random Access Memory |
| RF | Radio Frequency |
| ROM | Read Only Memory |
| SCO | Synchronous Connection Oriented |
| SIFS | Short Inter-Frame Space |
| SIM | Subscriber Identity Module |
| SSID | Service Set Identifier |
| STA | Station |
| TBTT | Target Beacon Transmit Time |
| TIM | Traffic Indication Map |
| TSF | Time Synchronization Function |
| TU | Time Unit |
| TV | Television |
| USB | Universal Serial Bus |
| UWB | Ultra Wideband |
| WiFi | Wireless Fidelity |
| WiMax | Worldwide Interoperability for Microwave Access |
| WiMedia | Radio platform for UWB |
| WLAN | Wireless Local Area Network |
| WMA | Windows Media Audio |
| WMV | Windows Media Video |

DETAILED DESCRIPTION OF THE INVENTION

The present invention is a novel and useful apparatus for and method of providing a mechanism for achieving coexistence between a Bluetooth system and WLAN system collocated in the same communications device such as a mobile terminal. The coexistence mechanism of the present invention functions to (1) monitor WLAN and Bluetooth system activity, (2) determine the access priority of both WLAN and Bluetooth systems, (3) predict Bluetooth high priority packet transmission patterns, (4) allocate bandwidth to both the Bluetooth and WLAN systems in accordance with the traffic patterns predicted, and (5) switch the antenna and control the Bluetooth and WLAN power amplifiers when required.

Although the mechanism of the present invention can be used in numerous types of communication systems, to aid in illustrating the principles of the present invention, the description of the coexistence mechanism is provided in the context of a Bluetooth/WLAN radio enabled communication device such as a cellular phone.

Although the coexistence mechanism of the present invention can be incorporated in numerous types of Bluetooth/WLAN enabled communication devices such a multimedia player, cellular phone, PDA, etc., it is described in the context of a cellular phone. It is appreciated, however, that the invention is not limited to the example applications presented, whereas one skilled in the art can apply the principles of the invention to other communication systems as well without departing from the scope of the invention.

Note that throughout this document, the term communications device is defined as any apparatus or mechanism adapted to transmit, receive or transmit and receive data through a medium. The term communications transceiver or communications device is defined as any apparatus or mechanism adapted to transmit and receive data through a medium. The communications device or communications transceiver may be adapted to communicate over any suitable medium, including wireless or wired media. Examples of wireless media include RF, infrared, optical, microwave, UWB, Bluetooth, WiMAX, WiMedia, WiFi, or any other broadband medium, etc. Examples of wired media include twisted pair, coaxial, optical fiber, any wired interface (e.g., USB, Firewire, Ethernet, etc.). The term Ethernet network is defined as a network compatible with any of the IEEE 802.3 Ethernet standards, including but not limited to 10Base-T, 100Base-T or 1000Base-T over shielded or unshielded twisted pair wiring. The terms communications channel, link and cable are used interchangeably.

The term multimedia player or device is defined as any apparatus having a display screen and user input means that is capable of playing audio (e.g., MP3, WMA, etc.), video (AVI, MPG, WMV, etc.) and/or pictures (JPG, BMP, etc.). The user input means is typically formed of one or more manually operated switches, buttons, wheels or other user input means. Examples of multimedia devices include pocket sized personal digital assistants (PDAs), personal media player/recorders, cellular telephones, handheld devices, and the like.

Some portions of the detailed descriptions which follow are presented in terms of procedures, logic blocks, processing, steps, and other symbolic representations of operations on data bits within a computer memory. These descriptions and representations are the means used by those skilled in the data processing arts to most effectively convey the substance of their work to others skilled in the art. A procedure, logic block, process, etc., is generally conceived to be a self-consistent sequence of steps or instructions leading to a desired result. The steps require physical manipulations of physical quantities. Usually, though not necessarily, these quantities take the form of electrical or magnetic signals capable of being stored, transferred, combined, compared and otherwise manipulated in a computer system. It has proven convenient at times, principally for reasons of common usage, to refer to these signals as bits, bytes, words, values, elements, symbols, characters, terms, numbers, or the like.

It should be born in mind that all of the above and similar terms are to be associated with the appropriate physical quantities they represent and are merely convenient labels applied to these quantities. Unless specifically stated otherwise as apparent from the following discussions, it is appreciated that throughout the present invention, discussions utilizing terms such as 'processing,' 'computing,' 'calculating,' 'determining,' 'displaying' or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention can take the form of an entirely hardware embodiment, an entirely software embodiment or an embodiment containing a combination of hardware and software elements. In one embodiment, a portion of the mechanism of the invention is implemented in software, which includes but is not limited to firmware, resident software, object code, assembly code, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium is any apparatus that can contain, store, communicate, propagate, or transport the program for use by or in connection with the instruction execution system, apparatus, or device, e.g., floppy disks, removable hard drives, computer files comprising source code or object code, flash semiconductor memory (USB flash drives, etc.), ROM, EPROM, or other semiconductor memory devices.

Coexistence Platform and Signaling

A block diagram illustrating an example embodiment of the Bluetooth and WLAN coexistence platform sharing a single antenna is shown in FIG. 1. The circuit, generally referenced 10, comprises a WLAN system 12, Bluetooth system 14, WLAN front end (FE)/RF antenna switch 16 and antenna 18. The invention is described in the context of a coexistence system wherein the WLAN Bluetooth systems share a single antenna.

In operation, the WLAN system functions as the master of the coexistence mechanism. The interface between the Bluetooth and WLAN systems comprises three signals (two inputs and one output from the perspective of the WLAN system) as described in Table 1 below.

TABLE 1

Bluetooth/WLAN signaling

| Signal Name | Direction | Description |
|---|---|---|
| BT_ACTIVITY | From BT | Asserted (logic high) during local BT RX and TX slots |

TABLE 1-continued

Bluetooth/WLAN signaling

| Signal Name | Direction | Description |
|---|---|---|
| BT_HP | From BT | Used to signal BT priority status and BT RX/TX status to PTA |
| RF_SD | To BT | Transmission confirmation; Permission for BT to transmit is asserted logic low |

The coexistence mechanism of the present invention is operative to perform several tasks including (1) monitor WLAN and Bluetooth system activity, (2) determine the access priority of both WLAN and Bluetooth systems, (3) predict Bluetooth high priority packet transmission patterns, (4) allocate bandwidth to both the Bluetooth and WLAN systems in accordance with the traffic patterns predicted, (5) and switch the antenna and control the Bluetooth and WLAN power amplifiers when required.

A key goal of the coexistence mechanism is to ensure the voice quality of both Bluetooth and WLAN links. The Bluetooth voice frames are set in advance thus making changes on the WLAN system side is the only permissible freedom of action. In order to achieve "clean voice" performance, WLAN system transactions are scheduled such that they do not impair Bluetooth transmissions.

Since the WLAN and Bluetooth systems within the communications device are sharing a single antenna, the probability of packet loss (PER) in both systems increases. This effect can potentially have a fatal influence on the WLAN system side. Missing too many continuous packets sent from the Access Point (AP) will cause the AP to decrease the packet rate. This, in turn, will cause the transmissions to last longer, which decreases the probability of receiving the packet even more. In the worst case, a disconnection occurs. A problematic scenario for the system is when the Bluetooth system activates voice operation which uses very short packet period. Since these short packets contain voice data, they are protected via a protection mode provided by the coexistence mechanism of the present invention.

The invention addresses the above problem by scheduling the transmissions of the AP and the STA. In accordance with the invention, AP transmissions are scheduled by utilizing Power Save (PS) mode (or APSD in QoS) and CTS-TO-SELF packets. The PS mode is initiated whenever the coexistence algorithm of the invention is enabled. The allocation of bandwidth is based on a packet wise mechanism in accordance with the priority of each packet and a fair partition of the bandwidth.

When a Bluetooth high priority (HP) transaction (transmission, packet or frame) is detected on the interface signaling lines (FIG. 1), a Bluetooth Prediction Machine (PRM) (part of a Packet Traffic Arbitration (PTA) module) is used to identify Bluetooth high priority transmission patterns. The operation of the PRM and PTA machines are described in more detail infra. The STA and AP transmissions are scheduled in the available time period between Bluetooth high priority frames. If there no periodic Bluetooth high priority traffic is detected, the WLAN system operates in PS mode, but without the need to schedule WLAN transmissions in such a way that will not harm Bluetooth transmissions.

Bluetooth and WLAN System Priorities

Two priorities (low and high priority) are defined for the WLAN and Bluetooth systems. In accordance with these priorities, the coexistence algorithm allocates bandwidth so as to provide maximum performance for both systems. Note that optimal performance is defined differently from case to case. For example, it may be defined as protecting voice quality, providing a maximum transmission rate or simply preventing the connection from failing.

Both Bluetooth and WLAN systems have states defined as high priority. In the Bluetooth system, high priority frames include the following:
  Voice packets (HV1/HV2/HV3/EV3/EV4/EV5)
  Page/Inquiry
  Page/Inquiry scan
  Master-Slave switch
  Sniff—first attempt only
  Park—first beacon only The Bluetooth high priority transaction should last for a maximum time of BtHPMaxTime. After this time has elapsed, the Bluetooth transactions are treated as Bluetooth low priority. This is to ensure operation of the WLAN system, even in the case where the Bluetooth system commits an illegal operation and dominates all the available bandwidth using high priority traffic.

WLAN high priority state is an internal state for the coexistence algorithm and does not appear in the signaling (FIG. 1). WLAN high priority is defined in the following cases:
Voice packets (in QoS, according to access category);
Rx Beacon;
Rx DTIM;
PS-NULL—to inform the AP on entering/exiting PS;
  Listen interval: waking periodically every several DTIM intervals (when no waking is needed on each DTIM);
  SPS: advanced scan, very short passive scan on several channels;
  TX procedure and PS-POLL+RX procedure: only when operating in Bluetooth high priority Protective mode (described infra);
  Scan: only when working in Bluetooth high priority Protective mode (described infra);
SCAN FOR ROAMING;
NULL: keeping the AP informed on status when STA is in PS;
  aTIMwindow: in IBSS. Provide the STA in PS mode the opportunity to receive ATIM messages indicating expected received data;

The WLAN high priority transaction lasts for a maximum time of WlanHPMaxTime. After this time has elapsed, the WLAN transactions are be treated as WLAN low priority. The purpose of this limitation is to ensure operation of the Bluetooth system, even in the event the WLAN commits an illegal operation and dominates all the available bandwidth using high priority traffic.

Note that low priority is defined as any case which is not defined as high priority.

Bluetooth and WLAN System Requests and Indications

There are several types of bandwidth requests, as listed and described hereinbelow. A Bluetooth low priority request is identified by an assertion of the BT_ACTIVITY signal wherein the BT_HP line is not asserted in the subsequent 1 microsecond. A Bluetooth high priority request is identified by an assertion of the BT_HP signal up to 1 microsecond after the BT_ACTIVITY signal has been asserted.

A WLAN TX request is an internal request, and has no evidence in the interface signaling (FIG. 1). A WLAN TX request is submitted each time WLAN traffic is waiting to be transmitted. A WLAN RX request is submitted each time WLAN traffic is expected to be received from the AP. Note that the WLAN RX request includes the all RX transaction, including TX of PS-POLL before the actual RX. Operating in PS mode, the AP transmissions are always scheduled and there is no need to create windows of opportunities for the AP and the expected RX is identified by the TIM element.

A request for a WLAN process, submitted by the process manager, synchronizes all the processes of the system that use shared resources. Example processes include scan, measurements, calibration, channel switch, etc. The WLAN HP indication functions to indicate whether the WLAN RX request, WLAN TX request or WLAN process request are high priority or low priority.

The WLAN end of service (EOS) indication is used to inform the PTA when the WLAN has ended an activity for which it submitted a request earlier. The term activity includes all parts of the transaction, for example:
MSDU delivery and the following ACK.
MSDU receive and the ACK respond.
PS-POLL delivery, the MSDU from the AP and the following ACK.
PS-POLL delivery, the ACK from the AP, the MSDU from the AP and the following ACK.
Time out if the procedure hasn't ended.
A programmable number of data packets with their ACK (to allow a burst of data transmissions). This number includes received and transmitted packets together, and it is configured via the register WlanEOSMaxPacket. The WlanEOSMaxPacket is bounded and limited by a timeout configured in the register WlanEOSMaxPacket_to. The time out is counted from the end of the last WLAN packet.
In APSD: until the end of the SP, or until MSDU with the more data bit=0.

Note that the Bluetooth equivalent of the WLAN EOS indication is the de-assertion of the BT_ACTIVITY signal.

Traffic Management

The coexistence mechanism comprises two primary working modes, both of which utilize PS mode. The first mode is referred to as the "common mode", which is the ordinary working operation of the system. The second mode is referred to as the Bluetooth high priority protective mode, in which special procedures are performed in order to protect Bluetooth high priority transmissions. In this mode, the WLAN traffic is scheduled such that it will not cause the AP to decrease its transmission rate until disconnection.

Bluetooth High Priority Protective Mode

When Bluetooth high priority traffic is identified (i.e. detected) based on the interface signaling (FIG. 1) between the Bluetooth and WLAN systems, the Bluetooth prediction machine (PRM) is activated. The purpose of the PRM is to trace periodic activity of Bluetooth high priority traffic (using the Bluetooth high priority pattern), and to decide whether the "Bluetooth high priority Protective mode should be entered or alternatively, to remain in "common mode". Note that not every Bluetooth high priority activity causes the system to enter "Bluetooth high priority protective mode". For example, a Bluetooth scan or sniff alone will not force the use of Bluetooth high priority protective mode.

The coexistence mechanism categorizes the AP into either a "fast AP" group or a "slow AP" group. The traffic management is tailored for each group. An AP is attributed to the "fast AP" group if the following parameters are configured as follows:

Vendor={manufacturer X or manufacturer Y, etc.}
OR/AND AP supports QoS
OR/AND Estimated AP rate is ≧5.5 Mbps AND Period detected in the PRM≧14 BT slots
OR/AND Period detected in the PRM≧24 BT slots
AND Register WlanSlowFastAP !=10;

Note that the condition for the fast AP is set using register WlanAPCondition. When an AP is categorized as a "fast AP," it is assumed that the AP can respond to a PS-POLL from a STA with a MSDU within 200 microseconds or any of the conditions detailed in Vendor parameters above. According to the WLAN specification, the AP can answer the PS-POLL immediately with MSDU (without ACK). Typically, APs answer the PS-POLL with an ACK and send the MSDU later.

Figure 2:
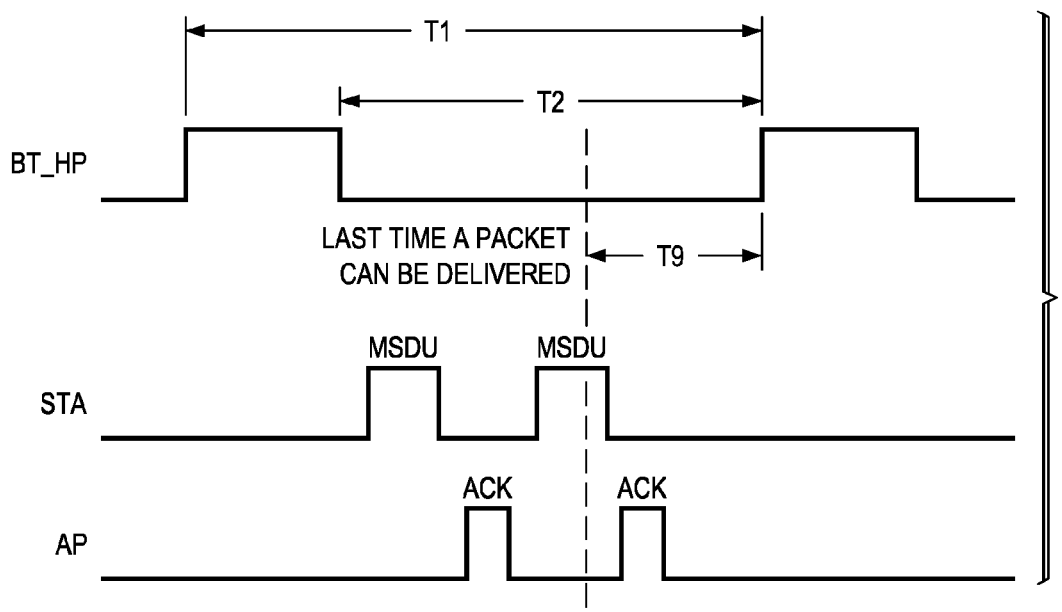
FIG. 2 is a timing diagram illustrating transmitter traffic management in Bluetooth high priority protective mode.

The transmission of uplink data from the STA to the AP takes place after an approval to transmit was accepted by the PTA. The PTA is not required to check any time limitations for the TX packets, but it permits transmitting until a certain point in time T9, as shown in the timing diagram of FIG. 2 which illustrates transmitter traffic management in Bluetooth high priority protective mode.

Since the TX is halted, and the RX window of a beacon can potentially last a long time (30 milliseconds as default) if the RX failed due to BT activity, there is a risk there will be no TX for this time in the event a beacon is missed (for example due to Bluetooth traffic). In order to prevent this, the RX window for receiving a beacon is reduced to 10 milliseconds.

The AP is scheduled to transmit (if needed, according to the TIM in the beacon) in the free Bluetooth high priority traffic windows, i.e. between Bluetooth high priority traffic transmissions. This is achieved by using a PS-POLL as quickly as possible in the free time space. Since the AP is a fast AP it is assumed that the AP returns a MSDU frame immediately as a response to the PS-POLL.

Figure 3:
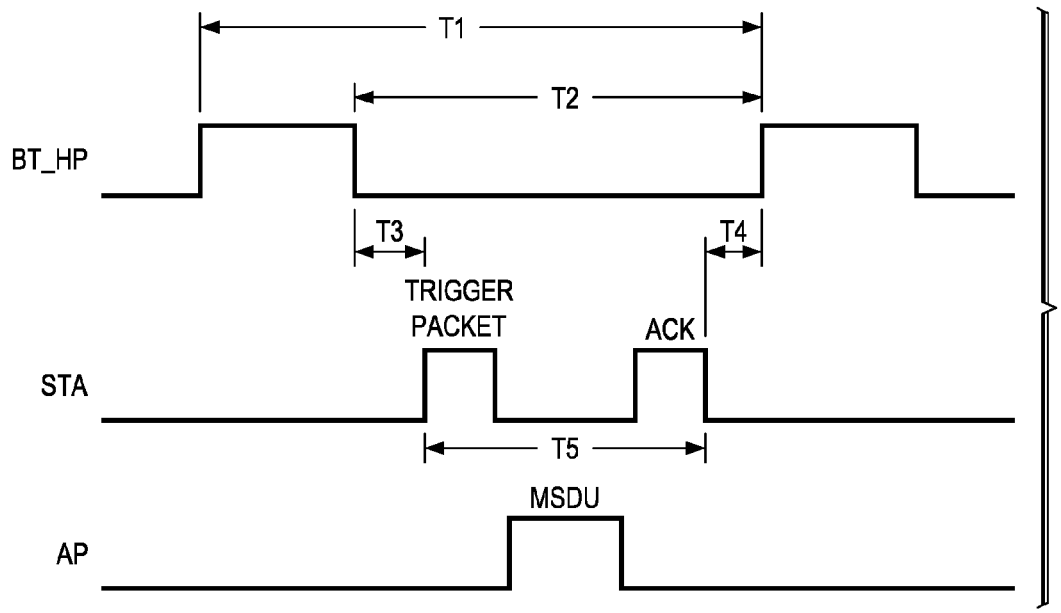
FIG. 3 is a timing diagram illustrating transmitter traffic management in Bluetooth high priority protective mode with a first fast Access Point option.
Figure 4:
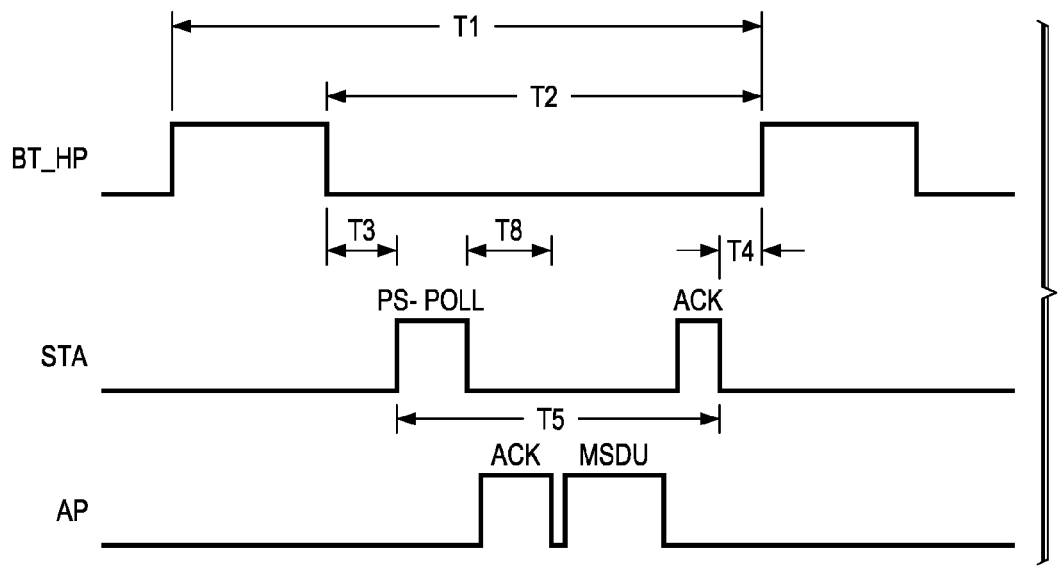
FIG. 4 is a timing diagram illustrating transmitter traffic management in Bluetooth high priority protective mode with a second fast Access Point option.

A timing diagram illustrating the transmitter traffic management scheme in Bluetooth high priority protective mode with a first fast Access Point option is shown in FIG. 3. A timing diagram illustrating the transmitter traffic management scheme in Bluetooth high priority protective mode with a second fast Access Point option is shown in FIG. 4.

The timing parameters expressed in microseconds are given below in Table 2.

TABLE 2

Timing constraints for traffic management in
Bluetooth high priority protective mode with a fast AP

| Parameter | Min | Max | Remark |
| --- | --- | --- | --- |
| T1 | | | Calculated in the PRM |
| T2 | | | Calculated in the PRM |
| T3 | 10 | T2−(T5 + T4_MIN) | |
| T4 | 0 | | |
| T5 | | | Predicted according to the AP and STA rates |
| T8 | | 200 | |
| T9 | T3 slow AP | T3 slow AP | |

The PS-POLL is sent as soon as possible in accordance with T3. The timing calculations are held in the PTA which authorizes the transmission of the PS-POLL according to the detailed time constraints.

Figure 5:
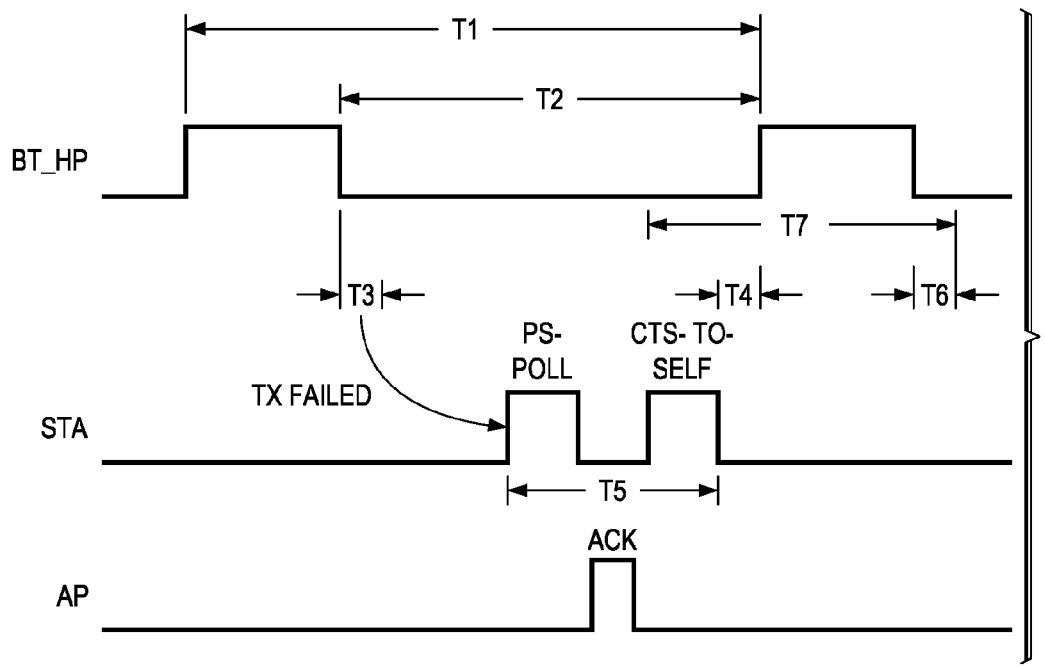
FIG. 5 is a timing diagram illustrating transmitter traffic management switching from fast to slow Access Point operation.

If T3 has elapsed, and a PS-POLL was not transmitted (for example due to high CCA), the specific complete transaction (until the EOS) will be switched from a "fast AP" traffic scheme to a "slow AP" traffic scheme, in which the same free time space is used. This switch provides for more efficient use of the link. At the end of the "slow AP" use, the system returns to "fast AP". A timing diagram illustrating transmitter traffic management switching from fast to slow Access Point operation is shown in FIG. 5.

Using real IEEE 802.11 'b' and 'g' operation numbers provides typical timing of the coexistence procedure (assuming the AP rates for 'b' and 'g' operation are: 11 Mbps and 12 Mbps, respectively).

Duration of 'g' preamble=24 microseconds
Duration of 'b' short preamble=96 microseconds
Duration of 'b' long preamble=192 microseconds
MPDU sizes (without headers):
    ACK=14 Bytes (assuming using 1 Mbps)=112 microseconds
    PS-POLL=20 Bytes (assuming using 1 Mbps)=160 microseconds
    MSDU=36 (MAC header+FCS)+1536 (data)=1572 Bytes=1144 microseconds (for 11 Mbps) or 1048 (for 12 Mbps)
    CTS=14 Bytes (assuming using 1 Mbps)=112 microseconds
'b' SIFS='g' SIFS=10 microseconds
Procedure duration for "fast AP"—option I=PS-POLL+SIFS+MSDU+SIFS+ACK
Procedure duration for "fast AP"—option II=PS_POLL+T8+MSDU+SIFS+ACK
Option I:
    'b' short preamble=(96+160)+10+(96+1144)+10+(96+112)=1724 microseconds
    'b' long preamble=(192+160)+10+(192+1144)+10+(192+112)=2012 microseconds
    'g'=(24+160)+10+(24+1144)+10+(24+112)=1508 microseconds
Option II:
    'b' short preamble=(96+160)+200+(96+1144)+10+(96+112)=1914 microseconds
    'b' long preamble=(192+160)+200+(192+1144)+10+(192+112)=2202 microseconds
    'g'=(24+160)+200+(24+1144)+10+(24+112)=1698 microseconds The theoretical maximum rate of the WLAN system is achieved when a full data MSDU is delivered each free time space. Therefore the following applies:

$$\text{max\_wlan\_rate} = \frac{1536 * 8 \text{ bits}}{1.25 \text{ msec} * 3 \text{ frames}} = 3.2 \text{ Mbps} \quad (1)$$

The minimum duration between two Bluetooth HV3 transmissions is 2.5 milliseconds=2500 microseconds. Assuming that a request for high priority can be submitted by the Bluetooth system 200 microseconds before, leaves only a net 2300 microseconds. In order to ensure use of this time frame, we need to use a short Backoff Time, that is typically shorter than 2300−2202=98 microseconds.

A fast AP fall back mechanism provides that if for WlanMaxFastAPFaults sequential times, the RX procedure is interrupted by Bluetooth high priority traffic, and the MSDU delivery failed, the AP will be treated as a slow AP.

Figure 6:
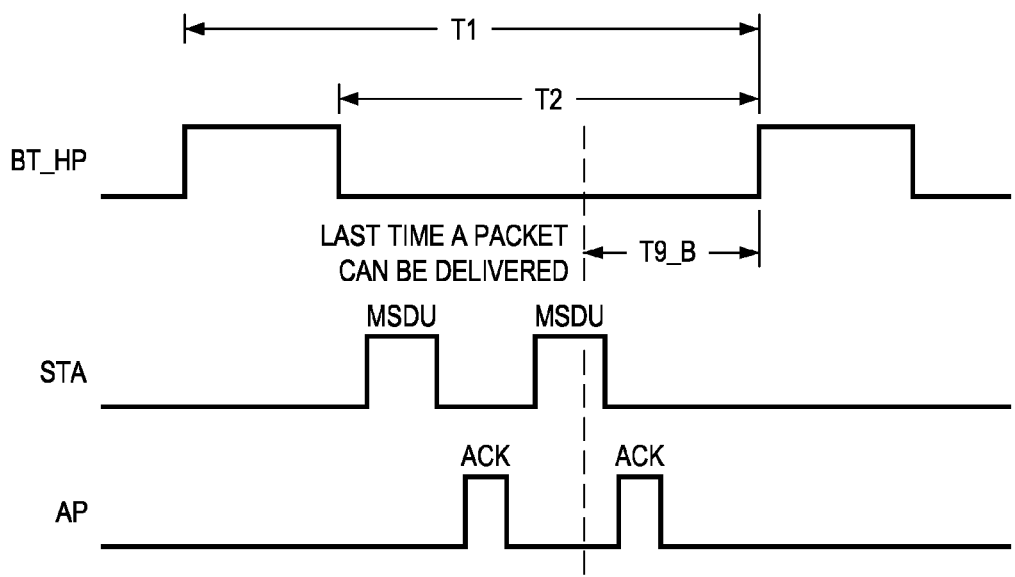
FIG. 6 is a first timing diagram illustrating transmitter traffic management in Bluetooth high priority protective mode for fast Access Point operation.

An example fast AP implementation is described below. The transmission of uplink data from the STA to the AP takes place after an permission to transmit is accepted from the PTA. Although the PTA does not check time limitations for the TX packets, it permits transmitting until a certain point in time T9_B, as shown in FIG. 6 which is a first timing diagram illustrating transmitter traffic management in Bluetooth high priority protective mode for fast Access Point operation.

Since the TX is halted, and the RX of a beacon may last a long time (30 millisecond default), there is a risk that no TX can occur for this time period in the event the beacon is missed (e.g., because of Bluetooth traffic). In order to prevent this, the RX window for beacon reception is reduced to 10 milliseconds.

Figure 7:
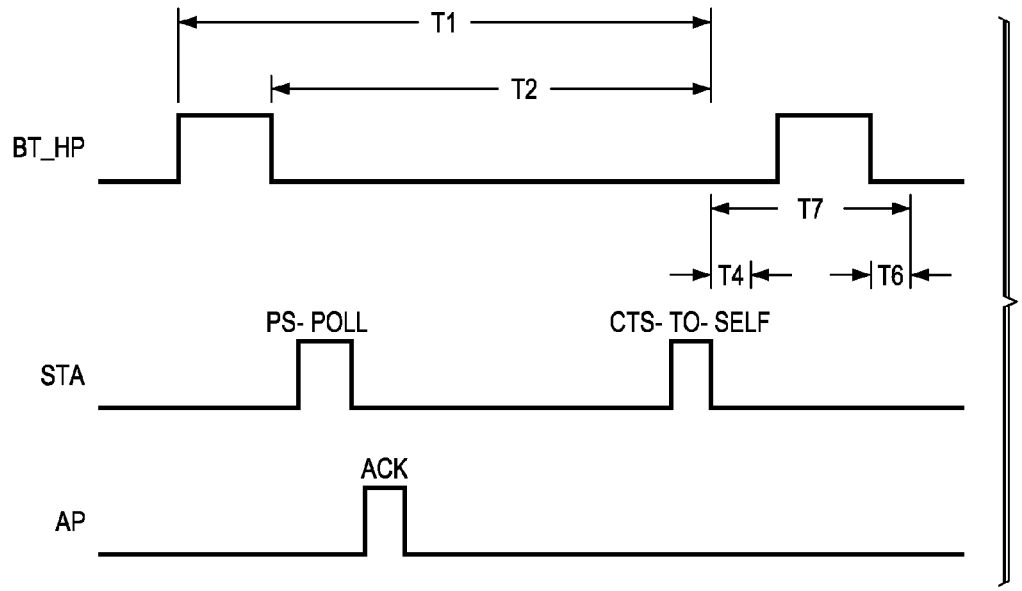
FIG. 7 is a second timing diagram illustrating transmitter traffic management in Bluetooth high priority protective mode for fast Access Point operation.

The PS-POLL is transmitted with no CTS-TO-SELF protection. The last point of time a PS-POLL can be delivered is T9_B, after which point the TX is disabled for any TX, beside ACK. When the system is in RX cycle, the Bluetooth high priority transmission is protected by CTS-TO-SELF, until the RX cycle ends. This is illustrated in FIG. 7 which is a second timing diagram illustrating transmitter traffic management in Bluetooth high priority protective mode for fast Access Point operation.

TABLE 3

T9_B and T4_B timing parameters

| Parameter | Min[usec] | Max[usec] |
|---|---|---|
| T9_B | 3000 | 3000 |
| T4_B | 1500 | 1500 |

When an AP is categorized as a slow AP, it is assumed that when the AP receives a PS-POLL from a STA, it responds with an ACK, and delivers the MSDU at a later time, longer than 200 microseconds.

The transmission of uplink data from the STA to the AP takes place after permission to transmit is received from the PTA. Although the PTA does not check time limitations for the TX packets, it permits transmitting until a certain point in time T9 (FIG. 3). Since the TX is halted, and the RX of a beacon may extend a long time (30 millisecond default), there is a risk no TX will occur for this time period in the event the beacon is missed (such as due to Bluetooth traffic). In order to prevent this, the RX window for beacon reception is reduced to 10 milliseconds.

The AP is scheduled to transmit (if needed, according to the TIM in the beacon) in the free Bluetooth high priority traffic windows (between Bluetooth high priority transmissions). This is achieved using PS-POLL and CTS-TO-SELF frames. Since the AP is a slow AP it is assumed the AP returns an ACK as a response to the PS-POLL, and that the MSDU is sent at a later time. In order to ensure that the AP does not transmit over the Bluetooth high priority, CTS-TO-SELF is used after the ACK from the AP. The CTS-TO-SELF duration is configured to include all the Bluetooth high priority transactions and spares. Note that the order of the packets can be changed. A CTS-TO-SELF may be sent before the PS-POLL.

Figure 8:
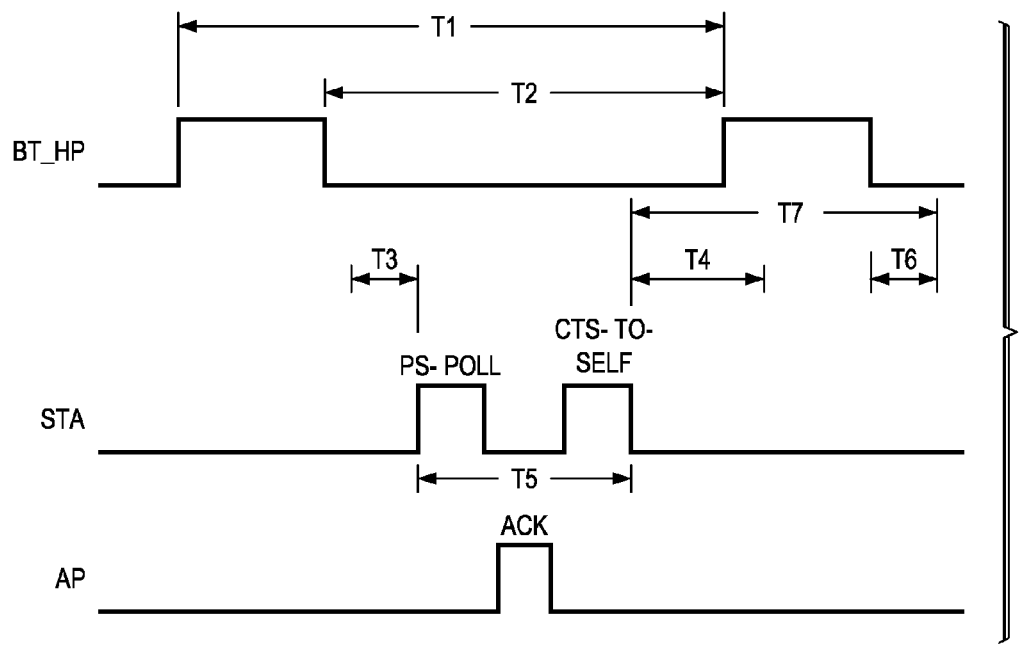
FIG. 8 is a first timing diagram illustrating transmitter traffic management in Bluetooth high priority protective mode with first slow Access Point option.
Figure 9:
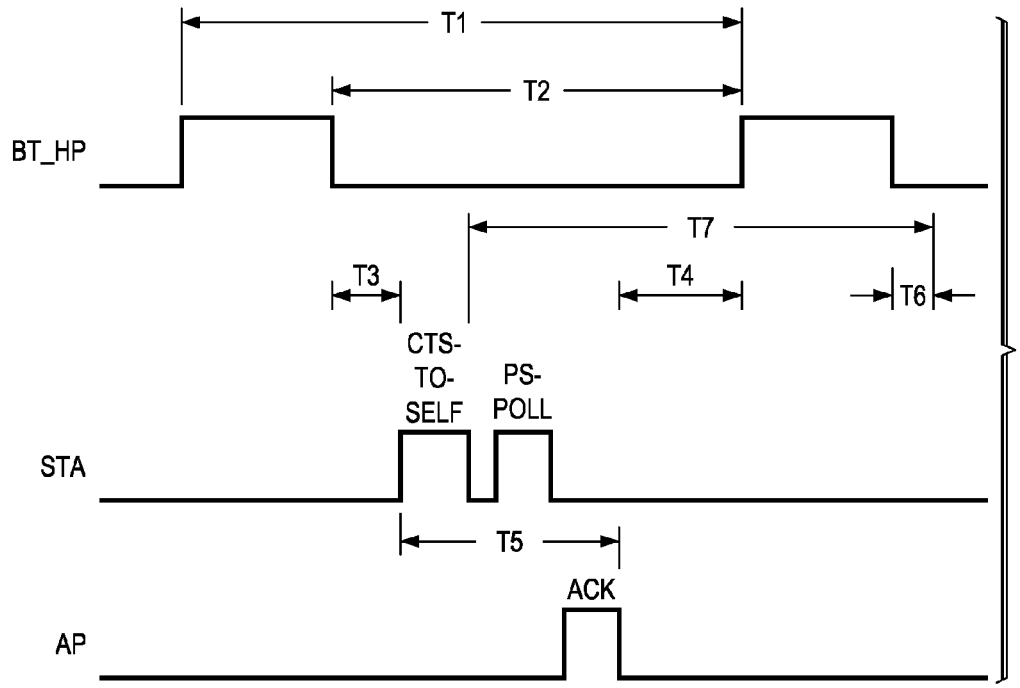
FIG. 9 is a second timing diagram illustrating transmitter traffic management in Bluetooth high priority protective mode with first slow Access Point option.

This traffic scheme is illustrated in FIGS. 8 and 9. A first timing diagram illustrating transmitter traffic management in Bluetooth high priority protective mode with first slow Access Point option is shown in FIG. 8. A second timing diagram illustrating transmitter traffic management in Bluetooth high priority protective mode with first slow Access Point option is shown in FIG. 9. This second timing diagram of FIG. 9 simply changes the packet order of FIG. 8.

The timing parameters expressed in microseconds are presented in Table 4 below.

TABLE 4

Timing constraints for traffic management in
Bluetooth high priority protective mode with a slow AP

| Parameter | Min | Max | Remark |
|---|---|---|---|
| T1 | | | Calculated in the PRM |
| T2 | | | Calculated in the PRM |
| T3 | 10 | T2-1500 (WlanSlowAPMaxTimeToCTS) | T3 max is set according to AP reaction time to PS-POLL |
| T4 | 0 | | |
| T5 | | | Predicted according to the AP and STA rates |
| T6 | 0 | 0 | |
| T7 | | Next BT_HP end time + T6 | CTS-TO-SELF duration |
| T8 | T2-1500B/AP_RATE | T2-350 (CTS-TO-SELF ≈ 350) | |
| T9 | T3 | T3 | |

It is preferred that the PS-POLL be sent as late as possible in accordance with T3 in order to minimize the CTS-TO-SELF abuse of bandwidth. The CTS-TO-SELF is sent SIFS after receiving the ACK. The timing calculations are stored in the PTA which determines whether to permit the transmission of the PS-POLL according to the detailed time constraints.

Figure 10:
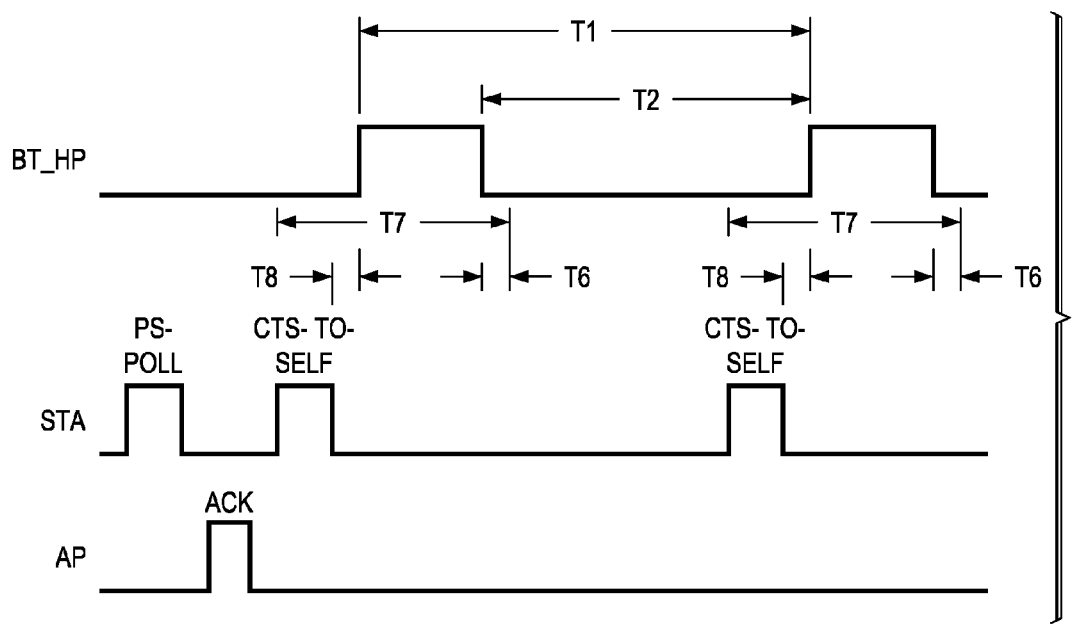
FIG. 10 is a timing diagram illustrating transmitter traffic management in Bluetooth high priority protective mode with second slow Access Point option.

The MSDU from the APs are expected to be received in the next Bluetooth high priority free window. If it is not received, the subsequent Bluetooth high priority is protected by transmitting another CTS-TO-SELF, as illustrated in FIG. 10 which is a timing diagram illustrating transmitter traffic management in Bluetooth high priority protective mode with a second slow Access Point option. The timing parameters are as provided in Table 4 supra.

The second CTS-TO-SELF is sent early enough to avoid the AP from starting to transmit the packet at a point of time whereby it will not be able to finish transmission successfully.

It is noted that the traffic management scheme (FIG. 6) has the potential to consume a significant amount of bandwidth, which might decrease BSS performance. In order to prevent this effect, the WLAN does not pull MSDUs from the AP during every possible free time space, but rather it waits WlanSlowAPSocial number of Bluetooth high priority transactions from the end of the last transaction, before it pulls the next MSDU from the AP.

If the AP is delayed for any reason, the number of times CTS-TO-SELF is sent is limited. The maximum number of CTS-TO-SELF (including the initial one) is configured using WlanSlowAPMaxCTS.

Table 5 below summarizes the maximum expected downlink throughput (using 802.11b 11 Mbps only, 1500 Byte packets and T3=1000 usec) as a function of the following parameters:

STAs in BSS: the number of STAs in the BSS (affects the AP reaction time to the PS-POLL, assuming 65% of 4 ms reaction time and 35% of 2.5 ms).

Wasted bandwidth: the bandwidth wasted by the CTS-TO-SELF (expressed as a percentage).

WlanSlowAPSocial: represents the number of Bluetooth high priority transactions the WLAN needs to wait from the end of the WLAN transaction to the next PS-POLL in slow AP operation.

Latency: the average latency of the downlink channel.

Latency: the maximum latency of the downlink channel caused by the PS procedure and the WlanSlowAPSocial parameter.

TABLE 5

Expected downlink throughput in slow AP operation

| | STA in BSS | | | | | | | |
|---|---|---|---|---|---|---|---|---|
| | 1 | | | | 2 | | | |
| WlanSlowAPSocial | 0 | 1 | 2 | 3 | 0 | 1 | 2 | 3 |
| Wasted bandwidth [%] | 67 | 33 | 22 | 17 | 69 | 42 | 30 | 24 |
| Latency [msec] | 3.75 | 7.5 | 11.25 | 15 | 6.18 | 9.93 | 13.68 | 17.43 |
| Max Latency [msec] | 3.75 | 7.5 | 11.25 | 15 | 7.5 | 11.25 | 15 | 18.75 |
| Max Expected downlink throughput [Mbps] | 3.2 | 1.6 | 1.07 | 0.8 | 2.16 | 1.25 | 0.9 | 0.7 |

If the AP has performed rate adaptation to a value of 5.5 Mbps or lower, it likely that the AP packets will not be received due to the packets being too long to be transmitted during the available free time spaces during which the antenna is allocated for the WLAN system. The occurrence of this can be detected if the STA identifies that its TIM bit is set, but the AP does not answer its PS-POLLs. If the STA does not successfully receive MSDUs from the AP for WlanSlowAPRecovery number of times despite the fact that the TIM bit is set, the STA restarts the rate adaptation of the AP by performing disassociation and association.

Using the 802.11b and g numbers as presented supra, the procedure duration for slow AP operation=PS-POLL+SIFS+ACK+SIFS+CTS_TO_SELF.

'b' short preamble=(96+160)+10+(96+112)+10+(96+112)= 692 microseconds

'b' long preamble=(192+160)+10+(192+112)+10+(192+112)=980 microseconds

'g'=(24+160)+10+(24+112)+10+(24+112)=476 microseconds

In connection with Independent Basic Service Set (IBSS), if the peer STA is in Awake mode, normal processing is performed. If the peer STA is in PS mode, however, the ATIM is sent in the ATIM window after PTA permission was received. The MSDU is sent in the next PTA approval. Since the TX is stopped, and the RX of a beacon may last a long time (30 milliseconds default), there is a risk that no TX will occur for this time period in the event the beacon is missed (for example due to Bluetooth traffic). To prevent this from occurring, the RX window for beacons is reduced to 10 milliseconds.

If a STA received a directed ATIM frame during the ATIM window, it acknowledges the directed ATIM (preferably according to expected Bluetooth high priority transactions) and remains awake for the entire beacon interval waiting for receipt of the announced MSDU(s). The Bluetooth high priority is protected with CTS-TO-SELF in the ATIM window and after (until the MSDU is received) only if an ATIM message was received and the STA is expecting to receive a MSDU. Note that the timing of the CTS-TO-SELF is as for a slow AP.

A beacon protection mechanism is provided as described herein. The occurrence of a periodic Bluetooth high priority transmission increases the probability that a WLAN beacon will be missed. Missing WLAN beacons cause the following effects: (1) drift of the TSF; and (2) missing the TIM, and as a result not pulling packets from the AP. Since the beacon interval is relatively long (i.e. 100-200 milliseconds), the throughput decreases significantly.

Figure 11:
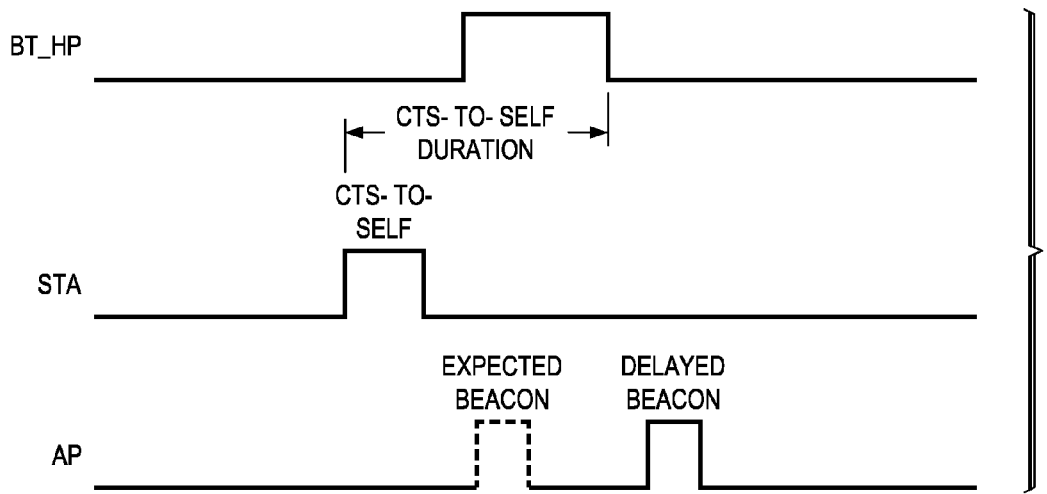
FIG. 11 is a timing diagram illustrating transmitter traffic management with the beacon protection mechanism.

The coexistence mechanism of the invention prevents potential damage caused by missing beacons by (1) setting the "listen interval" parameter to 1 (i.e. listen to each possible beacon); and/or (2) if for WLAN_beacon_protection_interval time no beacon was received, it is checked if the next expected beacon is to overlap the next Bluetooth high priority transmission. If so, the beacon is delayed until an available time space by transmitting CTS-TO-SELF with a duration overlapping the entire Bluetooth high priority transmission. A timing diagram illustrating transmitter traffic management with the beacon protection mechanism is shown in FIG. 11. Note that the beacon protection mechanism is activated only in Bluetooth protective mode.

Bluetooth Common Mode

The "common mode" of operation is the default state of the coexistence mechanism. A transition to the Bluetooth high priority protective mode is possible only if Bluetooth high priority is active, and the PRM has made a decision to enter the Bluetooth high priority protective mode. The common mode of operation is also using the PS mode, with an important difference between the Bluetooth high priority protective mode being that there are no timing constraints in the common mode, since there are no periodic Bluetooth high priority transmissions to protect. An arbitrary Bluetooth high priority transaction is permitted wherein it is immediately allocated bandwidth, but since it cannot be predicted in advance, it is not taken into consideration in the decision making process.

The common mode is based on the PTA method described below, wherein each system (Bluetooth and WLAN) generates requests and the PTA determines how to allocate access to the antenna on a packet by packet basis. Therefore, the packet managing scheme for common mode operation differs from the Bluetooth high priority protective mode: (1) there is no need to use CTS-TO-SELF; (2) the timing constraints detailed in the FIGS. 2 to 11 are not relevant; and (3) the Bluetooth and WLAN systems still send requests to the PTA for making bandwidth allocation decisions, but the PTA does not consider the next Bluetooth transaction in its decision (i.e. no time calculations). Further, there is no difference in use of "fast AP," "slow AP," IBSS or APSD modes. For these four modes, the basic traffic scheme is used.

Regarding TX data, the transmission of uplink data (i.e. from the STA to the AP) occurs after permission to transmit was is received from the PTA. The PTA does not need to consider the next Bluetooth transaction in its decision.

Figure 12:
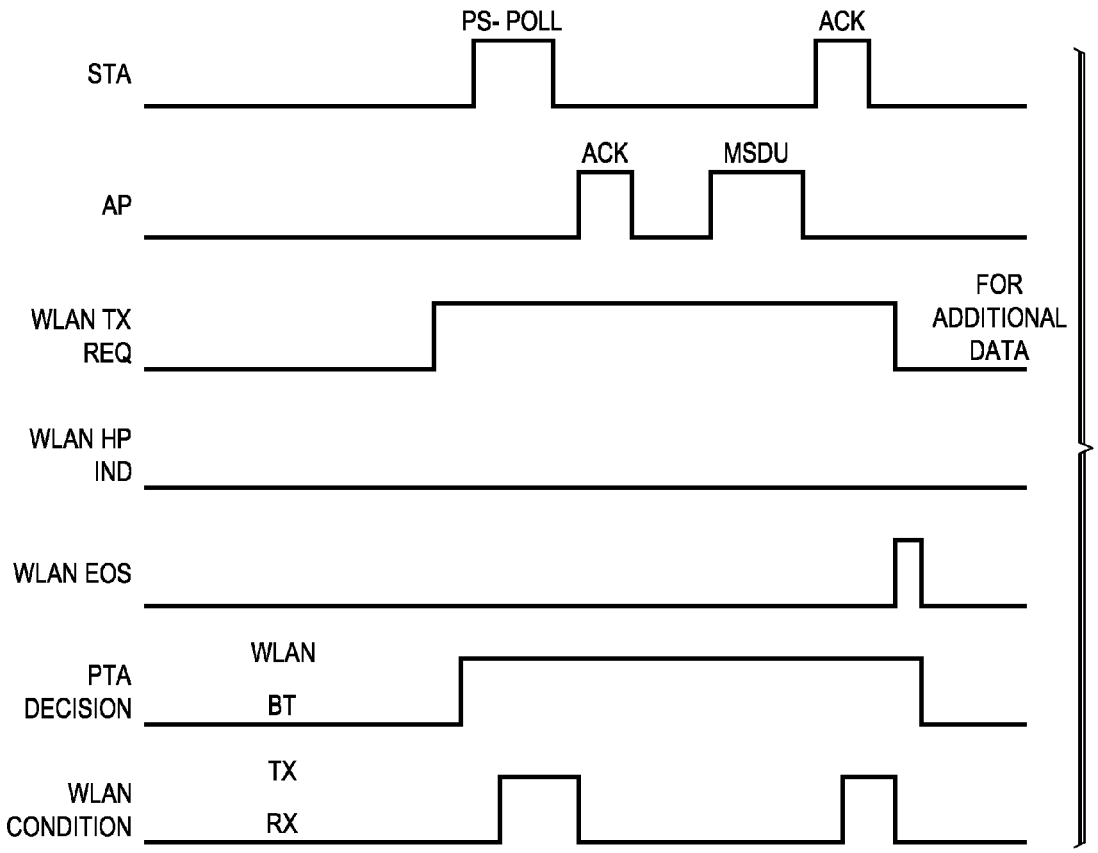
FIG. 12 is a timing diagram illustrating transmitter traffic management in common mode operation with slow Access Point operation.

Regarding RX data, the RX is performed using the PS delivery method, after approval is received from the PTA. A timing diagram illustrating transmitter traffic management in common mode operation with slow Access Point operation is shown in FIG. 12. Note that if a Bluetooth high priority transaction interrupts the common mode procedure, it is halted and will be started over again at the next opportunity.

Packet Traffic Arbitration (PTA) and the Bluetooth Prediction Machine (PRM)

Figure 13:
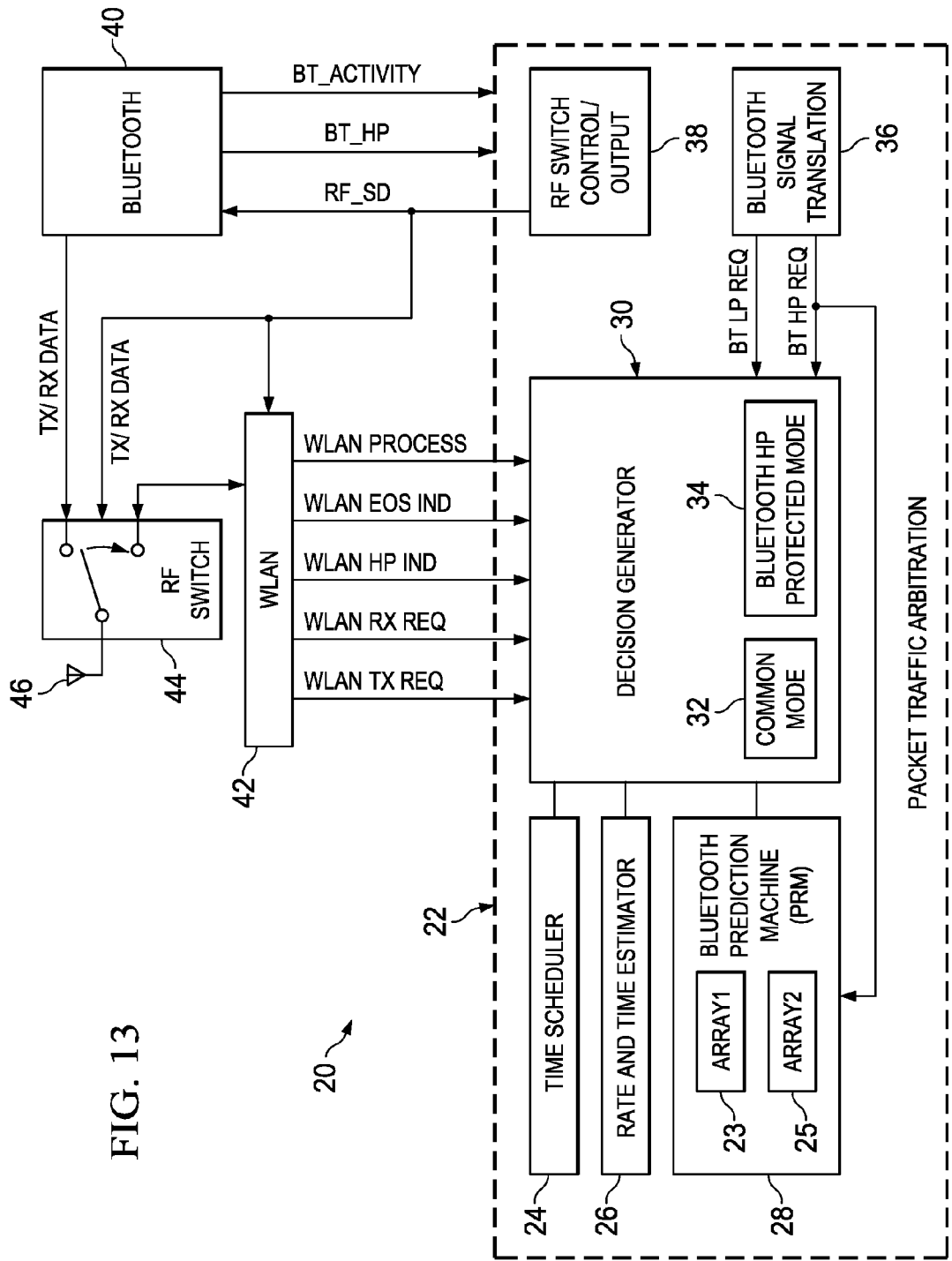
FIG. 13 is a block diagram illustrating the coexistence system including the packet traffic arbitration (PTA) machine of the present invention.

A block diagram illustrating the coexistence system including the packet traffic arbitration (PTA) machine of the present invention is shown in FIG. 13. The coexistence system, generally referenced 20, comprises the PTA 22, WLAN system 42, Bluetooth system 40, RF antenna switch 44 and antenna 46. The PTA 22 comprises a decision generator 30, common mode block 32, Bluetooth high priority protected mode block 34, RF antenna switch control/output block 38, Bluetooth signal translation 36, time scheduler 24, rate and time estimation block 26 and PRM 28.

Utilizing the Bluetooth Prediction Machine (PRM), the decision generator performs four principle functions: (1) trace periodic Bluetooth high priority transmissions; (2) decide whether to enter "Bluetooth high priority protective mode"; (3) identify the termination of periodic Bluetooth high priority transmissions; and (4) synchronize the WLAN system to the Bluetooth frame clock. Note that the PRM is activated whenever the coexistence mechanism is active.

The PRM is operative to identify the following Bluetooth patterns:
1. HV3 packet: cover up to a single time slot. Period=6 Bluetooth slots.
2. EV3 packet: cover up to a single time slot. Period ($T_{ESCO}$)= 4 to 6 Bluetooth slots.
3. EV4 packet: cover to up three time slots. Period ($T_{ESCO}$)=8 to 24 Bluetooth slots.
4. EV5 packet: cover up to three time slots. Period ($T_{ESCO}$)=8 to 36 Bluetooth slots.

The default values typically in use are referred to as prioritized periods. These values are likely to be the most common. The values include:

| | |
|---|---|
| 1. HV3 and EV3 | 6 Bluetooth slots |
| 2. EV4 | 24 Bluetooth slots |
| 3. EV5 | 36 Bluetooth slots |

The prioritized periods are hard coded. One additional prioritized period will be configured in the WlanPRIPeriods register. The example algorithm presented herein supports periods bigger than the following:
1. EV3 with $T_{ESCO}>=6$ slots
2. EV4 with $T_{ESCO}>=10$ slots
3. EV5 with $T_{ESCO}>=10$ slots Thus, the PRM attempts to detect only periods of 6 to 40 Bluetooth slots, or in terms of frames, 3 to 20 Bluetooth frames. Note that two consecutive slots of the same transaction (TX+RX or RX+TX) are considered a frame. The PRM operates in frame time units, since it is Bluetooth high priority, and the transactions are synchronized to the master, i.e. 1 frame unit=1.25 milliseconds.

The PRM operates based on the assumption that there are no more than four Bluetooth high priority transactions in parallel (i.e. voice, scan, AFH and sniff), and that non-voice transactions have a significantly longer period than voice transactions.

Figure 14:
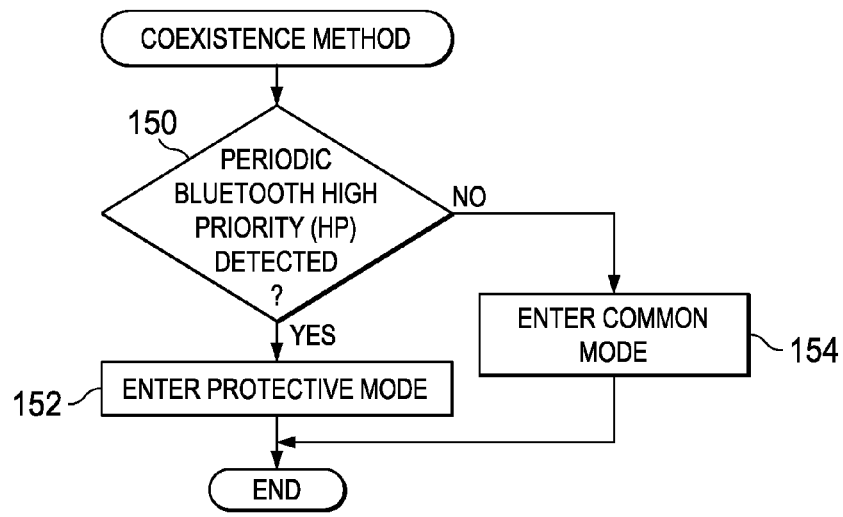
FIG. 14 is a flow diagram illustrating the overall coexistence method of the present invention.

A flow diagram illustrating the overall coexistence method of the present invention is shown in FIG. 14. If a periodic Bluetooth high priority transaction is detected (step 150), the protective mode is entered (step 152). If not, the common mode is entered (step 154).

Detecting Bluetooth High Priority Periods

The duration is defined as the time a Bluetooth transaction lasted, e.g., a typical HV3 transaction has a duration of 1.25 milliseconds. The period is defined as the time between high priority transactions, e.g., a typical HV3 transaction has a period of 3.75 milliseconds.

Figure 15:
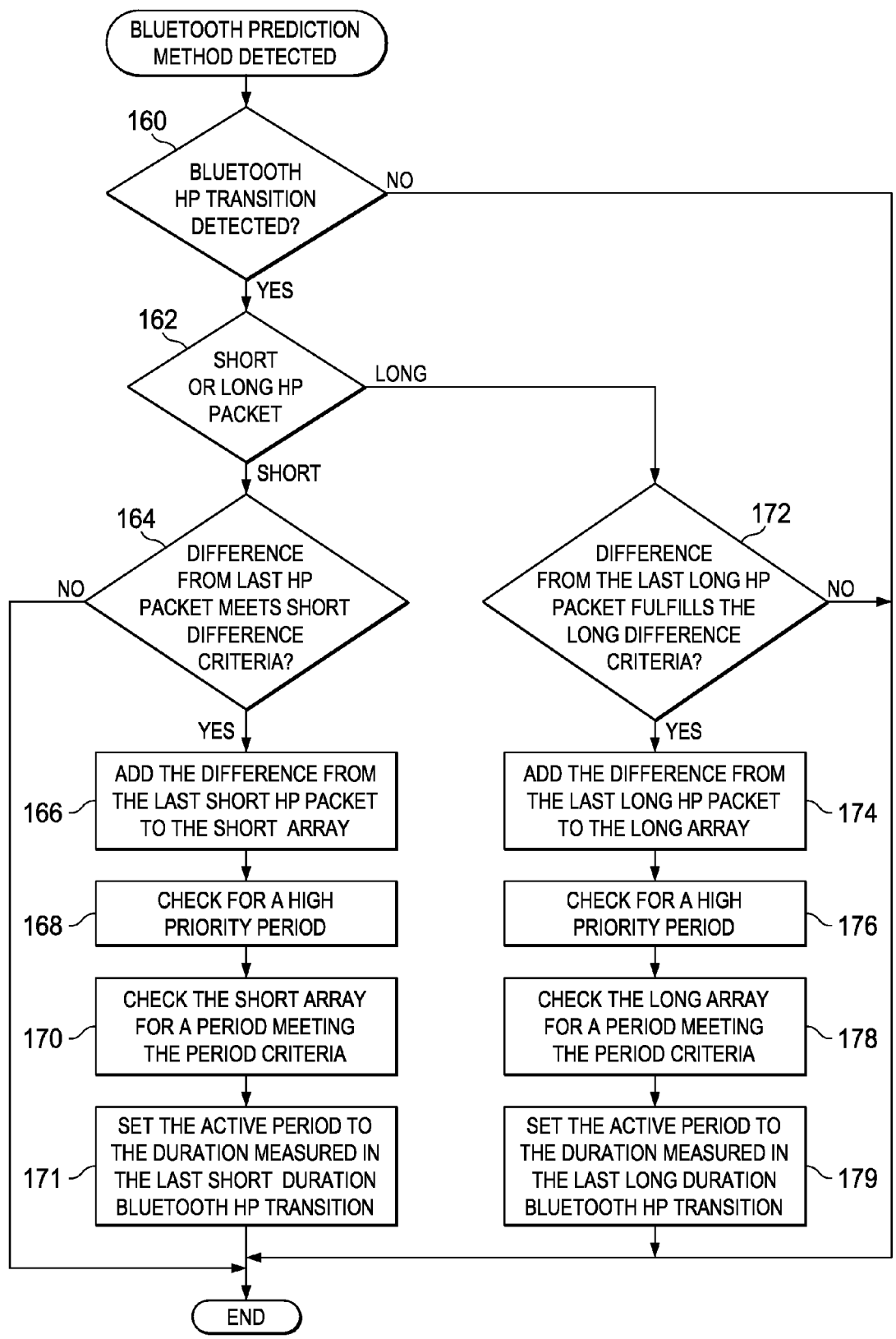
FIG. 15 is a flow diagram illustrating the Bluetooth detection and prediction method of the present invention.

A flow diagram illustrating the Bluetooth detection and prediction method of the present invention is shown in FIG. 15. With reference to FIGS. 13 and 15, the PRM maintains two orthogonal arrays, i.e. sets, which contain the differences between Bluetooth high priority transactions. The first array or short array (array #1 23) stores differences between short duration Bluetooth high priority transactions (the high priority transactions are less than 1.5 frames). The first array can contain up to 6 differences and is referred to as the first array or set size.

The second array or long array (array #1 25) stores differences between long duration Bluetooth high priority transactions (the high priority transactions are more than 1.5 frames but less than 3.1 frames). The second array can contain up to 8 differences and is referred to as the second array or set size.

When a new Bluetooth high priority transaction is detected (step 160), the PRM waits until the end of the transaction. The PRM checks the transaction to whether it is a short duration transaction or a long duration transaction (step 162). If the transaction is a short duration, the PRM determines the differences from the last short high priority packet and whether they meet short difference criteria (step 164). The PRM adds the differences values to the short array if the difference fulfills the following criteria (step 166).

To enter the first array (short duration), the difference must be 3<=difference<=12. A specific difference will not be entered to the first set (short duration): a difference of 4 if previously there were four or more differences of ones (i.e. the pattern 1, 1, 1, 1, 4 or more ones). This is because the long transaction that last 3 frames causes a split between short transactions that make them appear like a difference of 4. For example, a scan that appears in voice traffic as 1, 1, 1, 1, 1, 1, 1 . . . 1, 1, when between EV4 packets looks like 1, 1, 1, 1, 1, 1, 1, 4, 1, 1, 1 . . . .

It is then checked for a high priority period (step 168). The short array is searched for a period meeting the period criteria described below (step 170). If found, the active period is set according to the duration measured in the last short duration Bluetooth high priority transaction (step 171).

If the transaction is a long duration (step 162), the PRM determines the differences from the last long high priority packet and whether they meet long difference criteria (step 172). The PRM adds the differences values to the long array if the difference fulfills the following criteria (step 174).

To enter the second array (long duration), the difference must be 5<=diff<=24. It is then checked for a high priority period (step 176). The long array is searched for a period meeting the period criteria described below (step 178). If found, the active period is set according to the duration measured in the last long duration Bluetooth high priority transaction (step 179).

In this manner, retransmissions are not added to the arrays, and only logical periods according to packet type are counted. Each set will be filled in a cyclic way as follows. If the difference between transactions is bigger than 24 frames, the relevant set (i.e. either short or long) is cleared from all values. Note that if the station was in ELP before the difference was performed, the value of the difference is counted for set clearing.

After a new value is added to an array, a period search in the same array is performed in the following manner. For the short array, if 4 of the differences in the short array have a value identical to one of the prioritized periods, that period is declared as the active period. If 4 of the differences in the short array have the same value, the difference is declared as the active period.

For the long array, if 4 of the differences in the long array have a value identical to one of the prioritized periods, that period is declared as the active period. If 5 of the differences in the long array have the same value, that difference is declared as the active period.

The duration of the high priority transaction (T1-T2) is set according to the duration measured in the last Bluetooth high priority transaction which caused the period to be trigged. The PRM checks the value of the duration each sample of the period and changes the duration transferred to the decision mechanism only if it is bigger than the first one.

The PRM 28 sends the resultant period and duration information to the decision generator 30 as soon as possible. A summary of array parameters are presented below in Table 6.

TABLE 6

Summary of Array Parameters

| Parameter | First set (short duration) | Second set (long duration) |
|---|---|---|
| Set size | 6 | 8 |
| High priority value | 4 | 4 |
| Low priority value | 4 | 5 |
| Min difference to enter set | 3 | 5 |
| Max difference to enter set | 12 | 24 |

The PRM performs tracing on the active period, and checks if each sample occurred within the predicted time. This tracing is used both for synchronization and termination of the active period. The PRM synchronizes the prediction timing to the Bluetooth frame clock in every sample of the detected period. The PRM does not synchronize the system to high priority packets which are not a part of the period.

Figure 16:
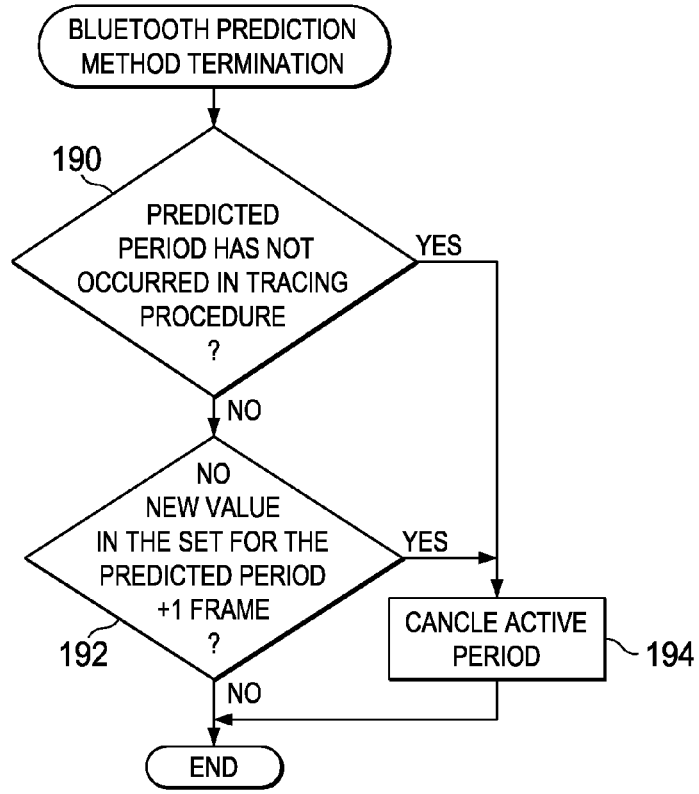
FIG. 16 is a flow diagram illustrating the Bluetooth prediction method of the present invention for terminating a Bluetooth high priority active period.

A flow diagram illustrating the Bluetooth prediction method of the present invention for terminating a Bluetooth high priority active period is shown in FIG. 16. The PRM cancels (i.e. terminates) an active period in one of the following cases: (1) if the trace procedure finds that a predicted period has not occurred (step 190); or (2) no new value in the array was found for the_predicted_period+1 frames (step 192). Each time the PRM cancels an active period, the relevant array (i.e. short or long) is cleared from all values.

If a Bluetooth high priority period was detected, and PS mode is possible, the PRM performs the following steps: (1) enters Bluetooth high priority protective mode; (2) sets the "listen interval" parameter to 1 (i.e. listens to every beacon, in order to reduce the probability of missing a beacon); and (3) optionally activates the beacon protection mechanism.

If a Bluetooth high priority pattern is not detected, or a detected pattern is terminated, or PS mode cannot be entered, the PRM performs the following steps: (1) enters/remains in "common mode" operation"; (2) returns/stays in default the "listen interval"; and (3) optionally deactivates the beacon protection mechanism.

PTA Machine

The PTA machine 22 (FIG. 13) is operative to receive the requests from the WLAN and Bluetooth systems, and in accordance with the streaming information and time constraints, manages the traffic over the link. The PTA machine operates on the fly, and makes decision for the next frame and during the current frame. The PTA allocates bandwidth according to the Bluetooth and WLAN system states, priorities and requests received therefrom. Note that the PTA operates differently whether or not Bluetooth high priority is in the background.

PTA in Common Mode

The PTA decision is made according to the WLAN and Bluetooth priorities and requests. In the "common mode" of operation there is no need to make rate and time estimates, since future Bluetooth activity is not a factor in the decision. As a default, the antenna is allocated in favor of the WLAN system.

Figure 17:
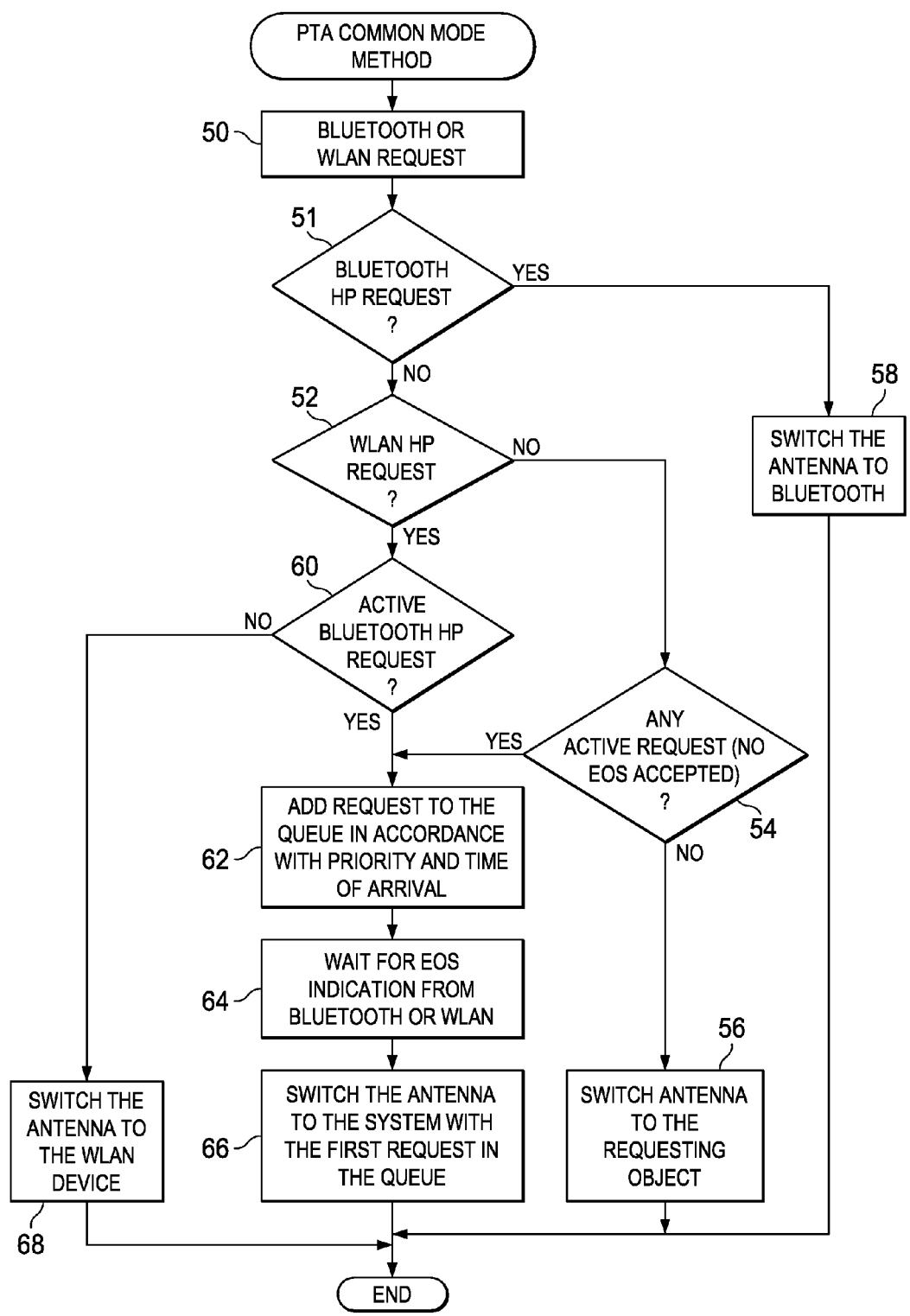
FIG. 17 is a flow diagram illustrating the PTA common mode method of the present invention.

The processing procedure of a request submitted to the PTA when in "common mode" is described below. A flow diagram illustrating the PTA common mode method of the present invention is shown in FIG. 17. The WLAN high priority will cancel a Bluetooth low priority transaction. Since there are a small number of WLAN events that are categorized as high priority, Bluetooth performance in not impacted significantly.

First, the request is checked whether it is Bluetooth or WLAN request (step 50). If the request is a Bluetooth high priority request (step 51), the antenna is switched to the Bluetooth system (step 58). If not, if the request is a WLAN high priority request (step 52) and a Bluetooth high priority request is not active (step 60), the antenna is switched to the WLAN device (step 68).

If the request is not a high priority Bluetooth or WLAN request (steps 52, 54) then if there are no active requests (step 54), the antenna is switched to the requesting object (step 56).

Figure 18:
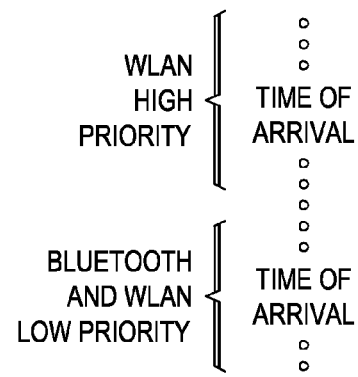
FIG. 18 is a diagram illustrating the PTA queue in more detail.

If an active request is received (step 54), the request is added to the queue according to the parameters of priority and time of arrival (step 62). The sequencing is made first based on priority (high to low: WLAN HP, Bluetooth and WLAN LP) and only as the second level on time of arrival. The method then waits for an EOS indication from the Bluetooth or WLAN systems (step 64). The antenna is then switched to the system with the first request in the queue (step 66). Bluetooth high priority gains bandwidth immediately and does not appear in the queue. A diagram illustrating the PTA queue in more detail is shown in FIG. 18.

As part of managing the queue, requests that are out of date are deleted. For example, RX for beacons that were not performed because of Bluetooth high priority may not relevant any more. A request can be returned to the queue after it was executed if the service was interrupted in the middle. For example, a WLAN high priority transaction that was cut by Bluetooth high priority will be returned to the queue.

If several requests for the same service are submitted while the same request was already active on the link, the time of arrival of the requests is the end of service (EOS) of the active service. If the requests for the service were submitted while the same request was not active, the time of arrival is the time of the first request.

For example, if several WLAN low priority TX requests are submitted while WLAN low priority transmissions are occurring over the air, the new request is added to the queue with time of arrival of the EOS of the WLAN low priority transmission only when the current transmission terminates. In the case of any other type of transmission over the air, only the first WLAN low priority TX request with its original time of arrival is added to the queue.

Figure 19:
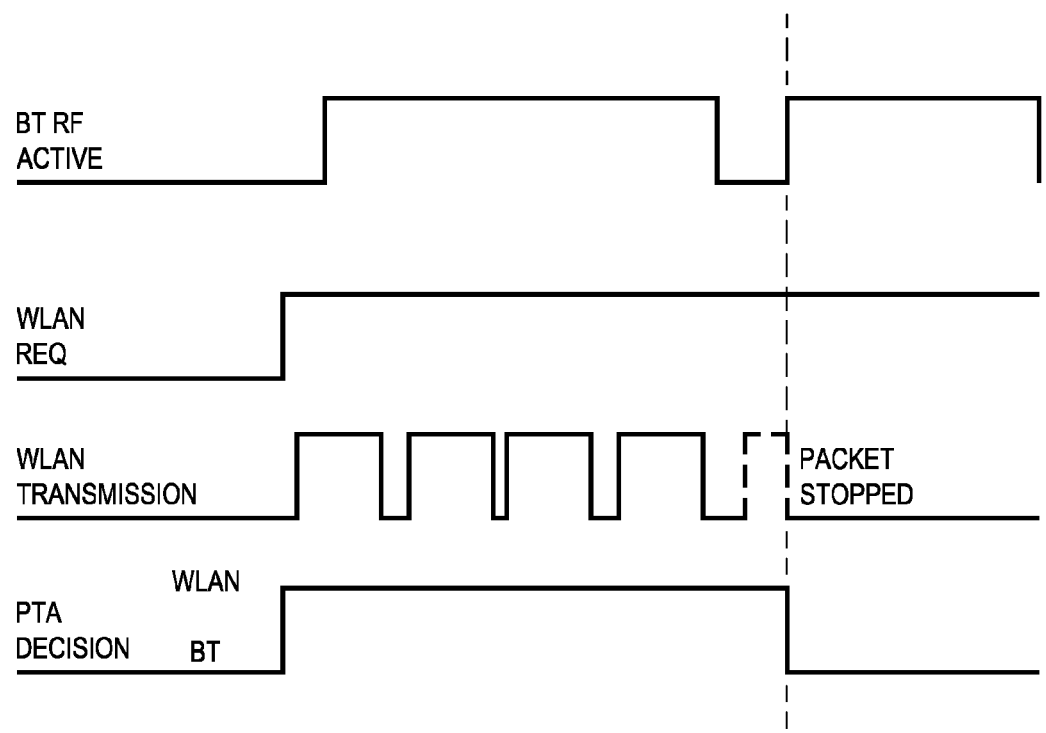
FIG. 19 is a timing diagram illustrating WLAN system timing utilizing unused Bluetooth bandwidth.

The WLAN transmissions can be scheduled to any desired point of time. Therefore, the WLAN transmissions are scheduled at the end of the Bluetooth transmissions. The opposite case, however, is different. The Bluetooth transmissions cannot be scheduled at the end of the WLAN transaction and a long period of time may elapse from the end of the WLAN transmission to the beginning of the next Bluetooth transmission (assuming the Bluetooth request was submitted during the WLAN TX and the WLAN ended only after the Bluetooth already began). In order to exploit this time period, the WLAN system continues transmitting (but not receiving) for as long as the Bluetooth BT_ACTIVITY signal (FIG. 1) is high (and the WLAN EOS was in the middle of the BT_ACTIVITY). In this case, the PTA immediately halts the WLAN transmission in the next assertion of the Bluetooth BT_ACTIVITY signal. The WLAN system is not permitted to RX in order to prevent AP rate fall back when the antenna is switched to the Bluetooth system. A timing diagram illustrating WLAN system timing utilizing unused Bluetooth bandwidth is shown in FIG. 19.

The WLAN system may have a burst of packets until the beginning of the next Bluetooth packet, or by using the WlanEOSMaxPacket value. The WlanEOSMaxPacket is bounded and limited by a timeout configured in the register WlanEOSMaxPacket_to. The time out is counted from the end of the last WLAN packet.

The Bluetooth system also has an opportunity to burst packets using the BtPTAMaxPacket register. This register comprises the number of Bluetooth requests, wherein only after fulfilling them all, can the PTA switch to WLAN low priority request. If BtPTAMaxPacket>1, the PTA mechanism is no longer single packet wise, but multi-packet wise. The BtPTAMaxPacket register is bounded and limited by a timeout configured in the register BtPTAMaxPacket_to. The time out is counted from the end of the last Bluetooth packet.

If a Bluetooth high priority transaction disrupted a WLAN transaction before it ended (i.e. before an EOS was accepted), the WLAN procedure starts again immediately after the termination of the Bluetooth high priority transmission and after the clear channel assessment (CCA) indicates the link is clear.

If a Bluetooth transmission intentionally disrupted a WLAN transaction as instructed by the PTA, the following actions are taken: (1) for TX, no fall back in rate occurs; and (2) for TX, the contention window (CW) value is not changed.

Note that an additional feature of the mechanism of the present invention is the capability to turn off the Bluetooth in the middle of a transaction. The decision whether to terminate the BT transmission in the middle of a transaction is based on WLAN and BT priority, and on power consumption considerations. As an example, when the WLAN is awaked for a beacon, and the BT is in low priority transmission, the algorithm shuts down the BT system and lets the WLAN receive the beacon transmission.

PTA in Bluetooth High Priority Protective Mode

When working in Bluetooth high priority protective mode, the PTA functions to protect the Bluetooth high priority transmissions and to ensure that AP transmissions are scheduled during free Bluetooth time space, in order to prevent the AP from performing rate fall back leading up to disconnection.

The PTA decisions take into consideration timing constraints for RX procedures only. The calculation of the timing constraints is based on the PRM inputs and rate estimator. For TX procedures, the PTA ensures that the TX is not starting after a well defined time location.

Figure 20:
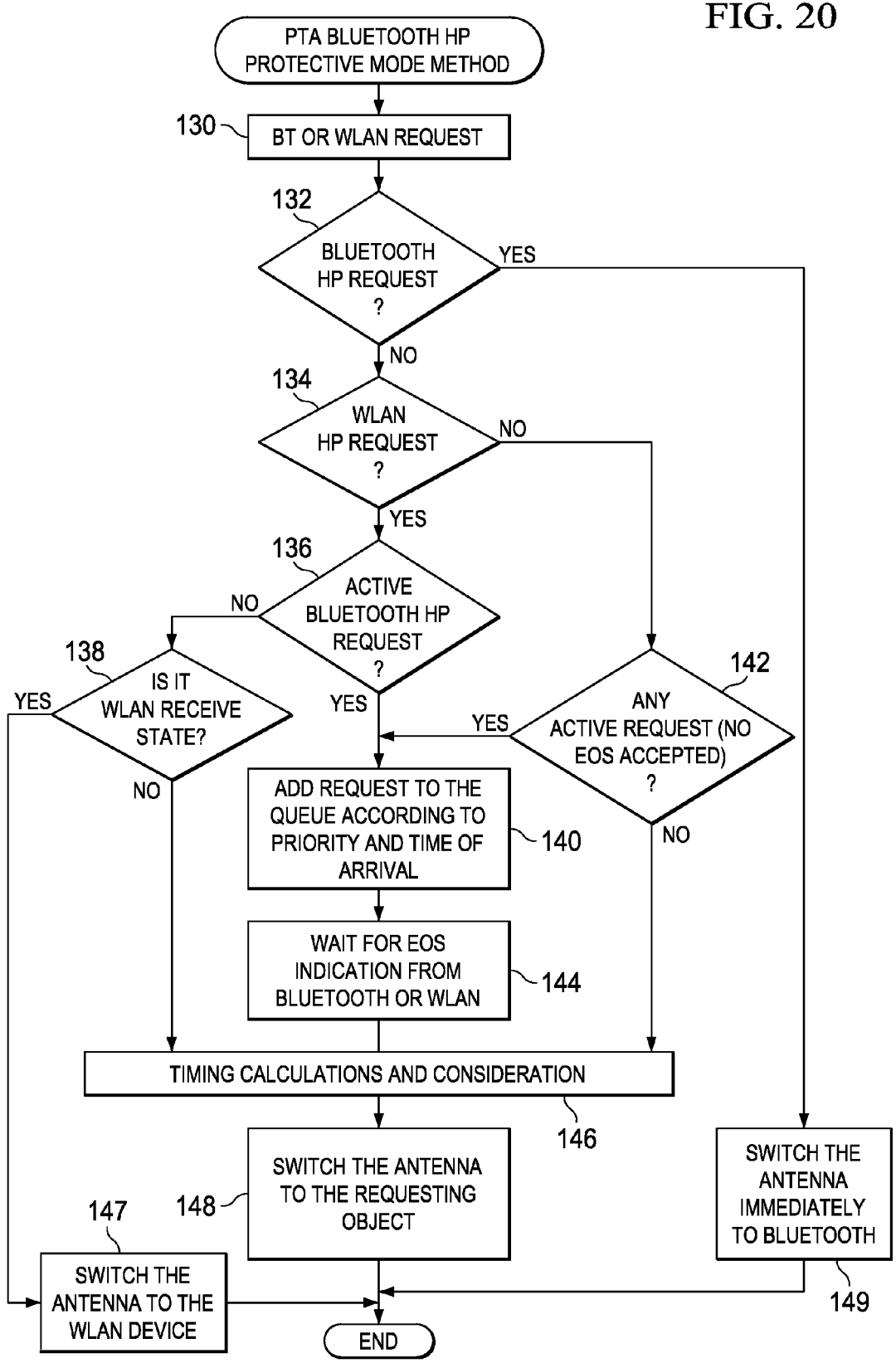
FIG. 20 is a flow diagram illustrating the PTA protective mode method of the present invention.
Figure 21:
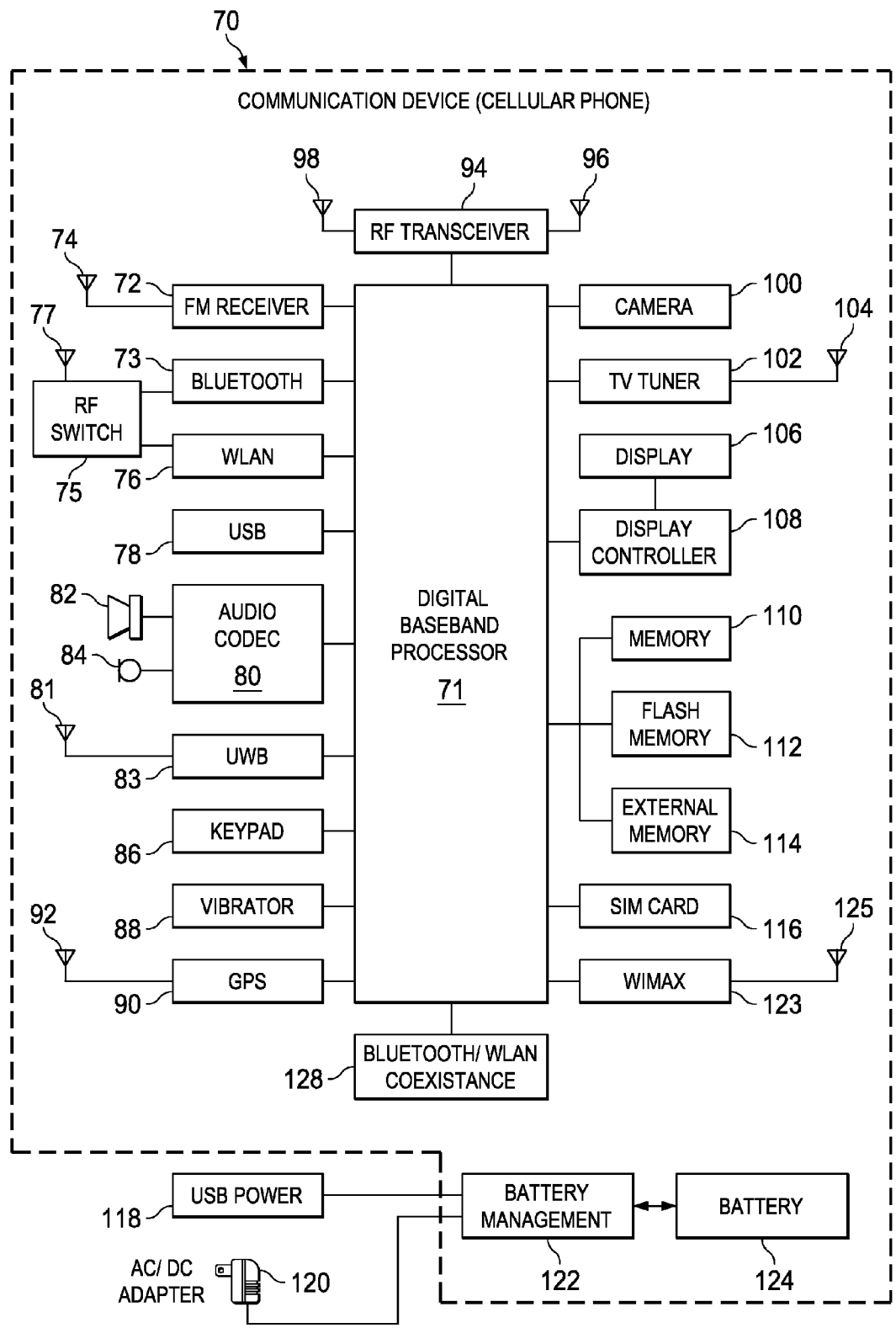
FIG. 21 is a simplified block diagram illustrating an example mobile handset incorporating the Bluetooth/WLAN coexistence mechanism of the present invention.

A flow diagram illustrating the processing procedure of a request submitted to the PTA when in protective mode is shown in FIG. 20. First, the request is checked whether it is Bluetooth or WLAN request (step 130). If the request is a Bluetooth high priority request (step 132), the antenna is immediately switched to the Bluetooth system (step 149). If not, if the request is a WLAN high priority request (step 134) and a Bluetooth high priority request is not active (step 136) and the request is a WLAN receive state (step 138), the antenna is switched to the WLAN device (step 147).

If the request is not a high priority Bluetooth or WLAN request (steps 132, 134) then if there are no active requests (step 142), the antenna is switched to the requesting object (step 148) after timing calculations and consideration are performed (step 146).

If an active request is received (step 142), the request is added to the queue according to the parameters of priority and time of arrival (step 140). The sequencing is made first based on priority (high to low: WLAN HP, Bluetooth and WLAN LP) and only as the second level on time of arrival. The method then waits for an EOS indication from the Bluetooth or WLAN systems (step 144). The antenna is then switched to the requesting object (step 148) after timing calculations and consideration are performed (step 146).

The queue associated with the requests is managed in a similar way to that of the common mode, with the one exception being if a request was denied because of time constraints, the PTA checks if the next request in the queue can represent the time constraint. This action ensures maximum use of the bandwidth by the existing requests.

If a Bluetooth transmission disrupts a WLAN transaction as directed by the PTA, the following actions are taken: (1) for TX, no rate fall back occurs; (2) for TX, the contention window (CW) value is not changed; and (3) for RX, the expected AP rate is updated to one rate lower than the current one.

Time Scheduler

The time scheduler 24 (FIG. 13) functions to (1) estimate the rate of the expected WLAN transaction (RX procedure only); (2) estimate the time needed for the entire transaction (i.e. from request to EOS); and (3) determine whether the request is ready to be executed.

The time scheduler performs its function only for WLAN requests. There is no need to activate the time scheduler for Bluetooth transmissions, since the Bluetooth system is not expected to collide with the Bluetooth high priority transmission. Therefore, when a Bluetooth request is received by time scheduler, it receives automatic approval from the point of view of time constraints.

Another request which receives automatic approval (from a time point of view) is the WLAN receive (e.g., RX scan), since this request does not involve AP transmissions. Another reason for automatic approval is the chance to end the task before the expected worse case end. For example, RX of a beacon can be ended very fast, while the theoretical duration of the beacon may be much longer.

If the WLAN receive is disrupted by Bluetooth high priority packets (e.g., transition of the antenna to the Bluetooth system before the EOS was received), the request is returned to the queue whereby the queue manager deletes it if it is no longer relevant.

The time scheduler functions to estimates the AP rate, referred to as PEER_RATE, in the following manner. If the peer packet was received successfully, the same rate is expected. If reception of the packet failed, a rate one lower is expected. The possible rate fall backs are presented below in Table 7. A rates are expressed in Mbps.

TABLE 7

Receiver Rate Fall Back

| Source rate | | Fall back to | |
|---|---|---|---|
| b/g | Rate | b/g | Rate [Mbps] |
| g | 54 | g | 48 |
| g | 48 | g | 36 |
| g | 36 | g | 24 |
| g | 24 | g | 18 |
| g | 18 | g | 12 |
| g | 12 | b | 5.5 |
| b | 11 | b | 5.5 |
| b | 5.5 | b | 2 |
| b | 2 | b | 1 |

In addition, the time scheduler functions to forecast the peer's contention window (CW). It starts from CWmin and changes the value in accordance with IEEE 802.11 specifications. The peer's backoff time for the time calculations is referred to as BACKOFF_MAX and is set to the maximum possible, i.e. max(CW). The ACK rate is estimated to be 1 Mbps. The packet size data is added to the rate estimation. The PEER_PACKET_SIZE is considered as the longest possible packet: 24/96/192 microseconds (for PLCP header of 'g'/'b' short preamble/'b' long preamble respectively)+1536 B (for data)+36 B (for MAC header and FCS). Using the expected rates and backoff, the time scheduler estimates the time of the entire transaction (i.e. from request to EOS indication). The estimation is based on the following:

$$STA\_PACKET\_EST = STA\_PACKET\_SIZE/STA\_RATE + PREAMBLE \quad (2)$$

$$PEER\_PACKET\_EST = PEER\_PACKET\_SIZE/PEER\_RATE + PREAMBLE \quad (3)$$

$$ACK = ACK\_PACKET\_SIZE/1\ Mbps + PREAMBLE \quad (4)$$

These three expressions are used by the following equations used to calculate duration. In the case of the beginning of WLAN RX fast AP, the request comprises a WLAN RX request and the expression for duration is given as $$\text{Duration}=\text{STA\_PACKET\_EST (PS-POLL)}+\text{T8}+\text{BACKOFF\_MAX}+\text{PEER\_PACKET\_EST}+\text{SIFS}+\text{ACK} \quad (5)$$

In the case of the beginning of WLAN RX slow AP, the request comprises a WLAN RX request and the expression for duration is given as $$\text{Duration}=\text{STA\_PACKET\_EST (PS-POLL)}+\text{SIFS}+\text{ACK}+\text{SIFS}+\text{STA\_PACKET\_EST (CTS-TO-SELF)} \quad (6)$$

In the case of the APs MSDU delivery as part of the WLAN RX slow AP, the request comprises a WLAN RX request and the expression for duration is given as $$\text{Duration}=\text{BACKOFF\_MAX}+\text{PEER\_PACKET\_EST}+\text{SIFS}+\text{ACK} \quad (7)$$

Equations 8, 9, 10 are valid when the STA backoff is zero, hence before the actual beginning. An earlier decision point should be taken into consideration. The PTA either approves or declines a request in accordance with the traffic management timing constraints presented in the tables hereinabove. Note that a request may be declined because it is submitted too late or too soon. The PTA comprises an internal mechanism for rechecking the status of received requests.

Antenna Allocation Before Entering PS Mode

The STA can be in one of three states within the process of entering PS mode: active, join or normal PS. In the active state the STA is active, but does not attempt to establish a connection. The STA requests to transmit over the antenna (i.e. transmit a beacon). In this case, the antenna is allocated on behalf of the Bluetooth system, and the WLAN system can also transmit over the antenna for its own use, as long as the Bluetooth activity is not high priority. Since the WLAN activity is minor, the Bluetooth does not suffer any performance degradation.

In the join state the STA starts the process of establishing a connection with the AP. The STA and the AP transact authentication, association and PS entering packets. Since this process is relatively short and of relative importance, the WLAN system is allocated the antenna, and the Bluetooth system gains access to the antenna it only for Bluetooth high priority traffic.

In the normal PS state the STA has already entered the PS mode. In this state, the antenna is allocated as described below. The RF antenna switch 44 (FIG. 13) comprises hardware control capability which operates such that when the WLAN system is in reset or shut down, the antenna is allocated to the Bluetooth system. This implementation ensures Bluetooth system behavior of the coexistence communications device presented below in Table 8 and WLAN system behavior of the coexistence communications device presented below in Table 9.

TABLE 8

Boundary Conditions for Bluetooth states

| | Case | | | |
|---|---|---|---|---|
| WLAN state | Bluetooth system turn on | Bluetooth system turn off | Bluetooth system reset | Bluetooth system on |
| On | Coexistence mechanism | Coexistence mechanism | Coexistence mechanism | Coexistence mechanism |
| Deep sleep | ANTENNA SWITCHED TO BT | ANTENNA SWITCHED TO BT | ANTENNA SWITCHED TO BT | ANTENNA SWITCHED TO BT |
| Off | WLAN hardware switches the antenna to the Bluetooth system. | WLAN hardware switches the antenna to the Bluetooth system. | WLAN hardware switches the antenna to the Bluetooth system. | WLAN hardware switches the antenna to the Bluetooth system. |

TABLE 9

Boundary Conditions for WLAN states

| | Case | | | |
|---|---|---|---|---|
| Bluetooth state | WLAN turn on | WLAN turn off | WLAN reset | WLAN on |
| On | WLAN hardware switches the antenna to the Bluetooth system. | WLAN hardware switches the antenna to the Bluetooth system. | WLAN hardware switches the antenna to the Bluetooth system. | Coexistence mechanism |
| Off | WLAN hardware switches the antenna to the Bluetooth system. | WLAN hardware switches the antenna to the Bluetooth system. | WLAN hardware switches the antenna to the Bluetooth system. | The antenna remains in WLAN control. |

Antenna Switching

The coexistence mechanism of the present invention is well suited for operation with single antenna use. An example of the single antenna platform is shown in and described in connection with FIGS. 1 and 13. The antenna switching process is typically very short, e.g., less than 1 microsecond.

The transformation from the Bluetooth system to the WLAN system is performed by (1) asserting the Bluetooth shutdown signal and (2) via the antenna switch. After switching from Bluetooth to WLAN, a configurable time delay BTtoWLANSwitchTime is invoked in order to ensure the Bluetooth system completes its ramp down. This time delay is used only if the Bluetooth transmission was interrupted, hence the BT_ACTIVITY signal was high. If the BT_ACTIVITY signal was low, the delay is set to a fixed value of 15 microseconds.

The transformation from the WLAN system to the Bluetooth system is performed by (1) stopping all TX procedures (including PA ramp down) and entering the RX state; (2) via the antenna switch. After switching from WLAN, a 2 microsecond delay is inserted in order to allow the WLAN system to complete its ramp down. This time delay is a needed only if the WLAN TX was interrupted. Both the antenna and the Bluetooth shutdown signal are asserted and de-asserted simultaneously as a function of the value of BTtoWLANSwitchTime.

In the example coexistence system presented herein, the isolation of the RF antenna switch is approximately 30 db. A Bluetooth transmission at 0 dBm is received in the WLAN as a narrowband interferer with −30 dBm. Therefore, it is preferable to configure the Bluetooth coexistence parameters such that the Bluetooth shutdown causes an immediate ramp down in the Bluetooth Power Amplifier (PA), thus halting a packet in the middle of transmission. For similar reasons, it is preferable to enable the AFH feature on the Bluetooth side. After the RF antenna is switched to the Bluetooth system, the WLAN system enters the RX state, and attempts to receive, despite the 30 db degradation of the antenna switch.

Mobile Device/Cellular Phone/PDA System

A simplified block diagram illustrating an example mobile communication device incorporating the BluetoothWLAN coexistence mechanism of the present invention is shown in FIG. 5. The communication device may comprise any suitable wired or wireless device such as a multimedia player, mobile station, mobile device, cellular phone, PDA, wireless personal area network (WPAN) device, Bluetooth EDR device, etc. For illustration purposes only, the communication device is shown as a cellular phone or smart phone. Note that this example is not intended to limit the scope of the invention as the Bluetooth/WLAN coexistence mechanism of the present invention can be implemented in a wide variety of wireless and wired communication devices.

The cellular phone, generally referenced 70, comprises a baseband processor or CPU 71 having analog and digital portions. The basic cellular link is provided by the RF transceiver 94 and related one or more antennas 96, 98. A plurality of antennas is used to provide antenna diversity which yields improved radio performance. The cell phone also comprises internal RAM and ROM memory 110, Flash memory 112 and external memory 114.

Several user interface devices include microphone 84, speaker 82 and associated audio codec 80, a keypad for entering dialing digits 86, vibrator 88 for alerting a user, camera and related circuitry 100, a TV tuner 102 and associated antenna 104, display 106 and associated display controller 108 and GPS receiver 90 and associated antenna 92.

In accordance with the invention, block 128 comprises the Bluetooth/WLAN coexistence mechanism of the present invention the operation of which is described in detail supra. In operation, the coexistence block 128 may be implemented as dedicated hardware, as software executed as a task on the baseband processor 71 or dedicated processor or a combination of hardware and software. Implemented as a software task, the program code operative to implement the Bluetooth/WLAN coexistence mechanism of the present invention is stored in one or more memories 110, 112, 114 or in on-chip volatile or non-volatile memory.

A USB interface connection 78 provides a serial link to a user's PC or other device. An FM receiver 72 and antenna 74 provide the user the ability to listen to FM broadcasts. WLAN radio and interface 76 provides wireless connectivity when in a hot spot or within the range of an ad hoc, infrastructure or mesh based wireless LAN network. A Bluetooth EDR radio and interface 73 provides Bluetooth wireless connectivity when within the range of a Bluetooth wireless network. In the example embodiment presented herein, the Bluetooth radio 73 and WLAN radio 76 share a single antenna 77 via RF antenna switch 75 that is controlled by the Bluetooth/WLAN coexistence block 128.

The communication device 70 may also comprise a WiMAX radio and interface 123 and antenna 125. SIM card 116 provides the interface to a user's SIM card for storing user data such as address book entries, etc. The communication device 70 also comprises an Ultra Wideband (UWB) radio and interface 83 and antenna 81. The UWB radio typically comprises an MBOA-UWB based radio.

Portable power is provided by the battery 124 coupled to battery management circuitry 122. External power is provided via USB power 118 or an AC/DC adapter 120 connected to the battery management circuitry which is operative to manage the charging and discharging of the battery 124.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of coexistence in a communications device incorporating a wireless local area network (WLAN) system and a Bluetooth system that share a single antenna, said method comprising the steps of:
   monitoring activity of said WLAN system and said Bluetooth system within said device;
   determining access priority of said WLAN system and said Bluetooth system;
   predicting high priority (HP) patterns of said Bluetooth system;
   allocating bandwidth of said device in accordance with said predictions; and
   switching said single antenna between said WLAN system and said Bluetooth system in accordance with said bandwidth allocation.

2. The method according to claim 1, wherein said step of allocating bandwidth comprises scheduling WLAN system transmissions to free time periods between Bluetooth high priority frames.

3. The method according to claim 1, wherein said WLAN system is caused to enter Power Save (PS) mode.

4. The method according to claim 1, wherein Access Points (AP) in communication with said device are caused to enter Power Save (PS) mode.

5. The method according to claim 1, further comprising the step of turn off said Bluetooth system in the middle of a transaction.

6. A coexistence communications device, comprising:
   a wireless local area network (WLAN) system;
   a Bluetooth system adapted to share a single antenna with said WLAN system;
   a Bluetooth prediction machine for predicting Bluetooth high priority transmission periods; and
   a decision generator for receiving requests from said Bluetooth system and said WLAN system and to allocate bandwidth to said WLAN system between Bluetooth high priority transmissions, wherein said allocation is made in accordance with the output of said Bluetooth prediction machine.

7. A coexistence communications device, comprising:
   a wireless local area network (WLAN) system;
   a Bluetooth system adapted to share a single antenna with said WLAN system;
   a Bluetooth prediction machine for detecting Bluetooth high priority transmission periods, wherein said Bluetooth prediction machine comprises means for predicting high priority patterns of Bluetooth transmissions by detecting differences between Bluetooth high priority transmission durations; and
   a decision generator for receiving requests from said Bluetooth system and said WLAN system and to allocate bandwidth therebetween in accordance with the output of said Bluetooth prediction machine.

8. The device according to claim 6, wherein said decision generator comprises means for immediately switching said Bluetooth system to said antenna in response to receipt of a Bluetooth high priority transmission request.

\* \* \* \* \*